United States Patent
Choi et al.

(10) Patent No.: US 10,506,545 B2
(45) Date of Patent: Dec. 10, 2019

(54) SCANNING METHOD USING POSITION INFORMATION OF TERMINAL IN WIRELESS ACCESS SYSTEM SUPPORTING MILLIMETER WAVES AND DEVICES FOR SAME

(71) Applicant: LG ELECTRONICS INC., Seoul (KR)

(72) Inventors: Kukheon Choi, Seoul (KR); Hyunsoo Ko, Seoul (KR); Kwangseok Noh, Seoul (KR); Dongkyu Kim, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 239 days.

(21) Appl. No.: 15/550,345

(22) PCT Filed: Apr. 1, 2015

(86) PCT No.: PCT/KR2015/003243
§ 371 (c)(1),
(2) Date: Aug. 10, 2017

(87) PCT Pub. No.: WO2016/129744
PCT Pub. Date: Aug. 18, 2016

(65) Prior Publication Data
US 2018/0049154 A1    Feb. 15, 2018

Related U.S. Application Data

(60) Provisional application No. 62/115,663, filed on Feb. 13, 2015.

(51) Int. Cl.
*H01Q 3/22*    (2006.01)
*H04W 64/00*   (2009.01)
(Continued)

(52) U.S. Cl.
CPC .......... *H04W 64/006* (2013.01); *H01Q 3/22* (2013.01); *H01Q 3/26* (2013.01); *H04B 7/0695* (2013.01);
(Continued)

(58) Field of Classification Search
CPC ........ H04B 7/0695; H04B 7/088; H01Q 3/22; H01Q 3/26; H04W 16/28; H04W 48/16;
(Continued)

(56) References Cited

FOREIGN PATENT DOCUMENTS

| KR | 1019950704871 | 11/1995 |
|----|---------------|---------|
| KR | 1020030055412 | 7/2003  |

(Continued)

OTHER PUBLICATIONS

PCT International Application No. PCT/KR2015/003243, Written Opinion of the International Searching Authority dated Oct. 5, 2015, 14 pages.

*Primary Examiner* — Dao L Phan
(74) *Attorney, Agent, or Firm* — Lee, Hong, Degerman, Kang & Waimey PC

(57) ABSTRACT

The present invention provides a scanning method to reduce overhead in a millimeter wave (mmWave) scanning scheme by using position information of a terminal in a mmWave system, and devices supporting same. The method for the terminal performing mmWave beam scanning based on position information mmWave beam scanning based on position information of the terminal in the wireless access system supporting millimeter wave (mmWave) technology, according to one embodiment of the present invention, comprises the steps of: receiving, from a legacy base station, a position reference signal; calculating measurement information to calculate the position information of the terminal based on the positioning reference signal; transmitting the measurement information to the legacy base station; receiv- (Continued)

ing, from a mmWave base station, first angle information generated based on the measurement information; determining a mmWave pCell by performing a first mmWave beam scanning based on the first angle information; and transmitting, to the mmWave pCell, a mmWave pilot signal for a second mmWave beam scanning.

10 Claims, 14 Drawing Sheets

(51) Int. Cl.
    *H04W 16/28*    (2009.01)
    *H04W 48/16*    (2009.01)
    *H04W 76/10*    (2018.01)
    *H01Q 3/26*    (2006.01)
    *H04B 7/08*    (2006.01)
    *H04B 7/06*    (2006.01)

(52) U.S. Cl.
    CPC ............ *H04B 7/088* (2013.01); *H04W 16/28* (2013.01); *H04W 48/16* (2013.01); *H04W 64/003* (2013.01); *H04W 76/10* (2018.02); *H04W 64/00* (2013.01)

(58) Field of Classification Search
    CPC .. H04W 64/003; H04W 64/006; H04W 76/10
    USPC ......................................................... 342/372
    See application file for complete search history.

(56) References Cited

FOREIGN PATENT DOCUMENTS

| | | |
|---|---|---|
| KR | 1020130021569 | 3/2013 |
| WO | 9411956 | 5/1994 |

Tk
Time taken for UE having predetermined
bandwidth for one BS beam direction to
perform scanning in all directions $T_{tx\_scan}$
Transmit pilot with determined Rx beam
and determine Tx beam (a) 60GHz indoor AoA measurement (b) 60GHz corridor AoA measurement (a)

(b)

(a) PAS change according to beam width (b) RMS DS change by directional antenna

1) SLP-SUPL Location Platform, SUPL-Secure User Plane Location
2) E-SMLC-Evolved Serving Mobile Location Center
3) GMLC-Gateway Mobile Location Center
4) LCS-Location Service (a) legacy small cell (b) mmWave small cell (a) BS estimates beam direction after estimating UE position (b) UE receives position information and then estimates beam direction (a) mmWave ray scanning and beam scanning in consideration of candidate direction (b) transmission of mmWave pilot corresponding to legacy pilot

SCANNING METHOD USING POSITION INFORMATION OF TERMINAL IN WIRELESS ACCESS SYSTEM SUPPORTING MILLIMETER WAVES AND DEVICES FOR SAME

CROSS-REFERENCE TO RELATED APPLICATIONS

This application is the National Stage filing under 35 U.S.C. 371 of International Application No. PCT/KR2015/003243, filed on Apr. 1, 2015, which claims the benefit of U.S. Provisional Application No. 62/115,663, filed on Feb. 13, 2015, the contents of which are all hereby incorporated by reference herein in their entirety.

TECHNICAL FIELD

The present invention relates to a wireless access system, and more particularly to a method for performing mmWave scanning using position information of a user equipment (UE) in a millimeter wave (mmWave) system.

BACKGROUND ART

Wireless access systems have been widely deployed to provide various types of communication services such as voice or data services. Generally, a wireless access system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

When an existing beamforming method applies to a mmWave system used on high frequency band, it may cause a problem that a considerably long time delay is generated from a beam searching and a problem that unique channel property of a radio channel cannot be obtained. Moreover, there is a problem that an existing ray scanning method is applicable to a system having a small cell size only.

DISCLOSURE

Technical Problem

The present invention is devised to solve the above problems, and one technical task of the present invention is to provide an efficient scanning method and a data transmit/receive (Tx/Rx) method for use in a mmWave system.

Another technical task of the present invention is to provide a method for reducing mmWave ray scanning overhead, mmWave beam scanning overhead, and/or mmWave beamforming overhead using position information of a user equipment (UE).

Technical tasks obtainable from the present invention are non-limited by the above-mentioned technical task, and other unmentioned technical tasks can be clearly understood from the following description by those having ordinary skill in the technical field to which the present invention pertains.

Technical Solutions

The present invention provides a method for performing scanning to reduce mmWave scanning overhead using UE position information in a mmWave system, and apparatuses for supporting the same.

The object of the present invention can be achieved by providing a method for performing mmWave beam scanning on the basis of UE position information by a user equipment (UE) in a wireless access system supporting millimeter wave (mmWave) technology including: receiving a positioning reference signal (PRS) from a legacy base station (BS); calculating measurement information for calculating position information of the UE on the basis of the positioning reference signal (PRS); transmitting the measurement information to the legacy base station (BS); receiving first angle information generated based on the measurement information from a mmWave base station (BS); determining a mmWave PCell by performing first mmWave beam scanning based on the first angle information; and transmitting a mmWave pilot signal for second mmWave beam scanning to the mmWave PCell.

The method may further include: calculating, by the user equipment (UE), second angle information indicating a set of angles at which the UE and the mmWave base station (BS) are scheduled to perform the second mmWave beam scanning on the basis of the first angle information.

The method may further include: transmitting, by the user equipment (UE), the second angle information to the mmWave base station (BS).

In accordance with another aspect of the present invention, a user equipment (UE) for performing mmWave beam scanning on the basis of UE position information in a wireless access system supporting millimeter wave (mmWave) technology includes a transmitter, a receiver, and a processor configured to support the mmWave beam scanning.

The processor receives a positioning reference signal (PRS) from a legacy base station (BS) by controlling the receiver, calculates measurement information for calculating position information of the UE on the basis of the positioning reference signal (PRS), transmits the measurement information to the legacy base station (BS) by controlling the transmitter, receives first angle information generated based on the measurement information from a mmWave base station (BS) by controlling the receiver, determines a mmWave PCell by performing first mmWave beam scanning based on the first angle information, and transmits a mmWave pilot signal for second mmWave beam scanning to the mmWave PCell.

The processor may calculate second angle information indicating a set of angles at which the UE and the mmWave base station (BS) are scheduled to perform the second mmWave beam scanning on the basis of the first angle information.

The processor may transmit the second angle information to the mmWave base station (BS) by controlling the transmitter.

The first angle information may be a set of some beam scanning angles contained in an angle range of 360° needed for performing first mmWave beam scanning. The second angle information may be a set of some beam scanning angles contained in an angle range of 360° needed for performing second mmWave beam scanning.

The legacy base station (BS) may establish a mmWave Tracking Area Group (TAG) including at least one mmWave base station (BS) to be used for execution of the mmWave beam scanning, and may transmit the position information to the at least one mmWave base station (BS).

The above aspects of the present invention are just parts of preferred embodiments of the present invention, and various embodiments reflecting the technical features of the present invention can be derived and understood from the following description by those having ordinary skill in the technical field to which the present invention pertains.

Advantageous Effects

As is apparent from the above description, the embodiments of the present invention have the following effects.

First, the embodiments of the present invention can efficiently perform scanning using the mmWave system.

Second, the embodiments of the present invention can reduce mmWave ray scanning overhead, mmWave beam scanning overhead, and/or mmWave beamforming overhead of a user equipment (UE) and mmWave base stations (mmWave BSs) using UE position information.

Effects obtainable from the present invention are non-limited by the above mentioned effect. And, other unmentioned effects can be clearly understood from the following description by those having ordinary skill in the technical field to which the present invention pertains. Namely, effects unintended in implementing the present invention can be derived from the embodiments of the present invention by those having ordinary skill in the technical field to which the present invention pertains as well.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. And, the accompanying drawings are used to describe embodiments of the present invention together with the detailed description.

BEST MODE

Figure 1:
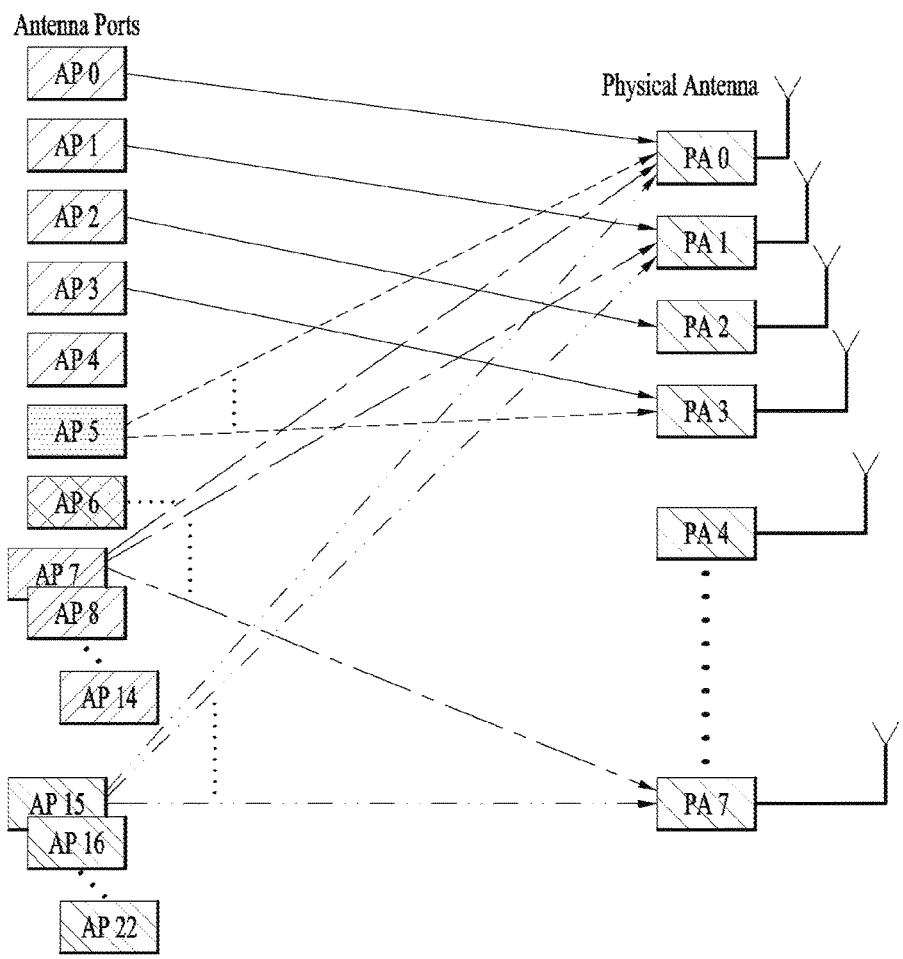
FIG. 1 is a diagram illustrating one example of an antenna port used in mmWave.

The following embodiments of the present invention described in detail provide a method for performing scanning to reduce mmWave scanning overhead using UE position information in a mmWave system, and apparatuses for supporting the same.

The following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In the description of the drawings, procedures, steps and the like that may obscure the concept of the present invention are not described and procedures or steps on the level understandable by those skilled in the art are not described as well.

In the whole specification, if a prescribed part 'comprises or includes' a prescribed component, this means that other components can be further included instead of excluding them unless a presence of especially opposed description. A term such as '~part', '~unit', 'module' and the like means a unit for processing at least one function or operation, which can be implemented by hardware, software or combination of hardware and software. Moreover, 'a or an', 'one', 'the' and similar related terms can be used as the meaning of including the singular and the plural both unless differently indicated in the present specification or clearly refuted by context.

In this specification, embodiments of the present invention are described centering on the data transmission/reception relations between a base station and a mobile station. In this case, the base station may be meaningful as a terminal node of a network which directly performs communication with the mobile station. In this disclosure, a specific operation explained as performed by a base station may be performed by an upper node of the base station in some cases.

In particular, in a network constructed with a plurality of network nodes including a base station, it is apparent that various operations performed for communication with a mobile station can be performed by a base station or other networks except the base station. Herein, 'base station (BS)' may be substituted with such a terminology as a fixed station, a Node B, an eNode B (eNB), an advanced base station (ABS), an access point (AP) or the like.

In the embodiments of the present invention, a terminal may be substituted with such a terminology as a user equipment (UE), a mobile station (MS), a subscriber station (SS), a mobile subscriber station (MSS), a mobile terminal, an advanced mobile station (AMS), or the like.

A transmitting end means a fixed and/or mobile node providing a data or voice service and a receiving end means a fixed and/or mobile node receiving a data or voice service. Hence, a mobile station and a base station may become a transmitting end and a receiving end in uplink, respectively. Likewise, a mobile station and a base station may become a receiving end and a transmitting end, respectively.

Embodiments of the present invention may be supported by the disclosed standard documents of at least one of wireless access systems including IEEE 802.xx system, 3GPP ($3^{rd}$ generation partnership project) system, 3GPP LTE system, and 3GPP2 system. Particularly, the embodiments of the present invention can be supported by documents of 3GPP TS 36.211, 3GPP TS 36.212, 3GPP TS 36.213, 3GPP TS 36.321 and 3GPP TS 36.331. In particular, the steps or parts, which are not explained to clearly reveal the technical idea of the present invention, in the embodiments of the present invention may be supported by the above documents. Moreover, all terminologies disclosed in this document may be supported by the above standard documents.

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention.

Specific terminologies used for the following description may be provided to help the understanding of the present invention. And, the use of the specific terminology may be modified into other forms within the scope of the technical idea of the present invention.

For instance, a cellular system may mean an LTE or LTE-A system, and a mmWave system may mean a system supportive of mmWave in the LTE or LTE-A system. Namely, the mmWave system means a wireless access system supportive of mmWave property. Moreover, a term called 'ray' in the embodiments of the present invention may mean a unique signal generated from mmWave link or a cluster of unique signals in case of not performing beamforming.

3GPP LTE/LTE-A system as one example of a wireless access system usable for embodiments of the present invention is described as follows.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like.

CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) system is an evolved version of 3GPP LTE system. To clarify the description of the technical features of the present invention, the description is made centering on 3GPP LTE/LTE-A system and may apply to IEEE 802.16e/m system and the like as well.

1. Millimeter Wave (mmWave)

The present invention relates to a signal transceiving method for detection of site specific ray property information unique to mmWave link and detection of abundant resolvable ray and apparatuses supporting the same. Due to an existing short mmWave cell range, it is essential to perform a beamforming for obtaining a transceiving antenna beam gain. Hence, a beamforming based beam scanning scheme has been proposed as a mmWave scanning scheme as well. Yet, such technologies have disadvantage that a transceiving scanning delay increases due to overhead according to a beam scanning.

A ray scanning scheme proposed by the present invention is effective in reducing a large overhead according to a beam scanning scheme by detecting a unique feature of a mmWave environment. Moreover, since information attributed to a transceived beam scanning of a user equipment is not unique property information (e.g., PDP (power delay profile, PAS (power azimuth spectrum, etc.) of channel, it can be used for acquisition and application of information unique to a channel.

1.1 Antenna Port

FIG. 1 is a diagram showing one example of an antenna port used in mmWave.

An antenna port is a virtual concept for a physical antenna. An output outputted through an antenna port should include a reference signal (RS). As an output outputted through a single antenna port includes an RS, it may be regarded as an antenna stream unit that can be received in a manner that a user equipment detects the RS and then estimates a channel.

Hence, no matter whether a single antenna stream is transmitted through two or more physical antennas or several physical antennas by spatial precoding (i.e., one of transmission beamforming), a user equipment can perform a reception by assuming a single antenna port.

Referring to FIG. 1, a physical antenna is configured by a separate mapping to an antenna port, and mapping between a physical antenna and an antenna port is determined according to a vender. Hence, it is unnecessary to consider an implementation problem of a physical antenna, but descriptions of a method of transmitting a signal or data per antenna port are taken into consideration.

1.2 Antenna Port Configuration of LTE system

The following Table 1 shows antenna ports used for physical channels and signals.

TABLE 1

| Physical channel or signal | Index $\tilde{p}$ | Antenna port number p as function of the number of antenna ports configured for the respective physical channel/signal | | |
|---|---|---|---|---|
| | | 1 | 2 | 4 |
| PUSCH | 0 | 10 | 20 | 40 |
| | 1 | — | 21 | 41 |
| | 2 | — | — | 42 |
| | 3 | — | — | 43 |
| SRS | 0 | 10 | 20 | 40 |
| | 1 | — | 21 | 41 |
| | 2 | — | — | 42 |
| | 3 | — | — | 43 |
| PUCCH | 0 | 100 | 200 | — |
| | 1 | — | 201 | — |

1.2.1 Precoding

A precoder of a transmitting end takes a block vector $[y^{(0)}(i) \ldots y^{(v-1)}(i)]^T$, $i=0, 1, \ldots, M_{symb}^{layer}-1$ as an input from a transmitting precoder and generates a block vector $[z^{(0)}(i) \ldots z^{(P-1)}(i)]^T$, $i=0, 1, \ldots, M_{symb}^{ap}-1$ mapped to resource elements.

Regarding the precoding for transmission on a single antenna port, the precoding is defined as $z^{(0)}(i)=y^{(0)}(i)$. Herein, $i=0, 1, \ldots, M_{symb}^{ap}-1$ and $M_{symb}^{ap}=M_{symb}^{layer}$.

The precoding for spatial multiplexing is only used together with a layer mapping for spatial multiplexing. Spatial multiplexing supports antenna port P=2 or P=4, and antenna port sets used for spatial multiplexing includes $p \in \{20,21\}$ and $p \in \{40,41,42,43\}$ respectively.

Precoding for spatial multiplexing is defined as $$\begin{bmatrix} z^{(0)}(i) \\ \vdots \\ z^{(P-1)}(i) \end{bmatrix} = W \begin{bmatrix} y^{(0)}(i) \\ \vdots \\ y^{(v-1)}(i) \end{bmatrix}.$$

Herein, $i=0, 1, \ldots, M_{symp}^{ap}-1$ and $M_{symb}^{ap}=M_{symb}^{layer}$.

A precoding matrix W having a size P×v for an antenna port P=2 is given by one of the entries shown in Table 2.

TABLE 2

| Codebook index | Number of layers | |
|---|---|---|
| | $v = 1$ | $v = 2$ |
| 0 | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |
| 1 | $\frac{1}{\sqrt{2}}\begin{bmatrix} 1 \\ -1 \end{bmatrix}$ | — |
| 2 | $\frac{1}{\sqrt{2}}\begin{bmatrix} 1 \\ j \end{bmatrix}$ | — |
| 3 | $\frac{1}{\sqrt{2}}\begin{bmatrix} 1 \\ -j \end{bmatrix}$ | — |
| 4 | $\frac{1}{\sqrt{2}}\begin{bmatrix} 1 \\ 0 \end{bmatrix}$ | — |
| 5 | $\frac{1}{\sqrt{2}}\begin{bmatrix} 0 \\ 1 \end{bmatrix}$ | — |

A precoding matrix W having a size P×v for an antenna port P=4 is given by one of the entries shown in Table 3. In Table 3, each row is represented in order of increasing a codebook index from the left to the right. Table 3 shows a case that v is 1. If v is 2 to 4, Tables 5.3.3A.2-3 to 5.3.3A2-5 of TS36.211 v12.3 specifications are referred to.

TABLE 3

| Codebook index | Number of layers $v = 1$ |
|---|---|
| 0-7 | $\frac{1}{2}\begin{bmatrix}1\\1\\1\\-1\end{bmatrix} \frac{1}{2}\begin{bmatrix}1\\1\\j\\j\end{bmatrix} \frac{1}{2}\begin{bmatrix}1\\1\\-1\\1\end{bmatrix} \frac{1}{2}\begin{bmatrix}1\\1\\-j\\-j\end{bmatrix} \frac{1}{2}\begin{bmatrix}1\\j\\1\\j\end{bmatrix} \frac{1}{2}\begin{bmatrix}1\\j\\j\\1\end{bmatrix} \frac{1}{2}\begin{bmatrix}1\\j\\-1\\-j\end{bmatrix} \frac{1}{2}\begin{bmatrix}1\\j\\-j\\-1\end{bmatrix}$ |
| 8-15 | $\frac{1}{2}\begin{bmatrix}1\\-1\\1\\1\end{bmatrix} \frac{1}{2}\begin{bmatrix}1\\-1\\j\\-j\end{bmatrix} \frac{1}{2}\begin{bmatrix}1\\-1\\-1\\-1\end{bmatrix} \frac{1}{2}\begin{bmatrix}1\\-1\\-j\\j\end{bmatrix} \frac{1}{2}\begin{bmatrix}1\\-j\\1\\-j\end{bmatrix} \frac{1}{2}\begin{bmatrix}1\\-j\\j\\-1\end{bmatrix} \frac{1}{2}\begin{bmatrix}1\\-j\\-1\\j\end{bmatrix} \frac{1}{2}\begin{bmatrix}1\\-j\\-j\\1\end{bmatrix}$ |
| 16-23 | $\frac{1}{2}\begin{bmatrix}1\\0\\1\\0\end{bmatrix} \frac{1}{2}\begin{bmatrix}1\\0\\-1\\0\end{bmatrix} \frac{1}{2}\begin{bmatrix}1\\0\\j\\0\end{bmatrix} \frac{1}{2}\begin{bmatrix}1\\0\\-j\\0\end{bmatrix} \frac{1}{2}\begin{bmatrix}0\\1\\0\\1\end{bmatrix} \frac{1}{2}\begin{bmatrix}0\\1\\0\\-1\end{bmatrix} \frac{1}{2}\begin{bmatrix}0\\1\\0\\j\end{bmatrix} \frac{1}{2}\begin{bmatrix}0\\1\\0\\-j\end{bmatrix}$ |

1.2.2 Mapping for Physical Resource

Regarding each antenna port p used for PUSCH (Physical Uplink Shared Channel) transmission in a subframe, a block $z^{(\tilde{p})}(0), \ldots, z^{(\tilde{p})}(M_{symb}^{ap}-1)$ of complex symbols should be multiplied by an amplitude scaling factor $\beta_{PUSCH}$ to secure a transmit power $P_{PUSCH}$, mapped to a sequence starting with $z^{(\tilde{p})}(0)$ for physical resource blocks for the antenna port p, and is assigned for PUSCH transmission. Relation between an index $\tilde{p}$ and an antenna port p is given by Table 1. Mapping for a resource element corresponding to a physical resource block for transmission starts from a first slot of a corresponding subframe and is mapped in increasing order of index 1 after index k.

Moreover, regarding mapping for a resource element (k, l) corresponding to a physical resource block; (1) it is not used for transmission of a reference source; (2) if a user equipment performs SRS transmission in a specific subframe, it is not mapped to a last SC-FDMA symbol of a corresponding subframe; (3) if PUSCH transmission overlaps with a cell-specific SRS bandwidth partially or fully, it is not mapped to a last SC-FDMA symbol within a subframe configured with a corresponding cell-specific SRS; (4) it is not mapped to a part of SC-FDMA symbol reserved for SRS transmission possible in UE-specific aperiodic SRS subframe; and (5) if UE is configured with multiple TAG, it is not mapped to a port of SC-FDMA symbol reserved for possible SRS transmission in UE-specific periodic SRS subframe within a specific serving cell.

For details of physical resource mapping for antenna port p, Paragraph 5.3.4 of v12.1 version of 3GPP TS36.211 specifications can be referred to.

1.3 Cell Search (Measurement, Evaluation, Detection) Method

The term "cell search" used in the embodiments is a collective term indicating a combination of measurement, evaluation, and detection processes. Cell search may be a first step to be initially performed before the UE performs cell selection, and may be very closely associated with the cell selection process. In addition, the cell search process may greatly affect energy consumption of an idle-mode UE.

The term "DRX cycle" used in cell search may be a kind of timer. The measurement, evaluation, and/or detection process(es) may be performed for a specific time defined by the number of DRX cycles. In the idle mode, the DRX cycle may be decided by the network on the basis of the SIB1 message.

The term "scan" is not explicitly defined in standard documents, most UEs may perform this scanning process. The scanning process may be a tuning process for a specific frequency, and may be the simplest signal (e.g., Received Signal Strength Indicator (RSSI), etc.) quality measurement procedure. Generally, the UE may first perform the scan process before the measurement and evaluation processes. In order to perform the next process (e.g., measurement, evaluation, etc.), a small number of candidates may be selected. If the UE immediately performs the measurement and evaluation process for all available frequencies and bands, the UE may consume an excessively long period of time and an excessively large amount of power.

The measurement process is a process for measuring RSRP and RSRQ (Reference Signal Received Quality), and may be performed according to LTE/LTE-A 36.133 in association with measurement of all non-serving cells. The evaluation process may be a process for confirming a cell selection reference on the basis of the result of the measurement process. The detection process may perform tuning and synchronization of a specific frequency, and may decode basic information of the cells.

One example of the initial scan and cell search process for a WCDMA system will hereinafter be given. The WCDMA system is a previous version of the LTE/LTE-A system, and the following description can also be applied to LTE/LTE-A system.

If the UE is initially powered on or exits cell coverage, the UE may detect and search for a new cell. The UE must perform blind decoding because it is impossible to recognize which frequency of a certain cell will be used for UE camp-on. For example, it is assumed that the UE supports WCDMA Band I. In this case, the BS located in the vicinity of the UE may use frequency channels 10562 to 10838. In other words, the UE may use 276 available frequencies.

Under this assumption, the UE may measure RSSI for each of the supported channels. RSSI may be a measurement value (e.g., energy, power, etc.) capable of being measured by the UE. RSSI measurement need not use the channel coding process. Therefore, the UE need not recognize any of information regarding the network. That is, in order for the UE to detect a physical cell identifier (ID), the WCDMA system need not decode a PCPICH and the LTE system need not decode synchronous/reference signals. The UE has only to measure power for each channel. The UE may measure RSSI for each channel, such that the UE may generate the list of channel numbers using the measured RSSI.

Subsequently, the UE may sort channels, each of which has RSSI higher than a threshold value, using the generated list of channel numbers. Thereafter, the UE may perform the following steps to search for an appropriate candidate needed for UE camp-on.

The UE may decode a PDPICH or synchronous/reference signals, so that the UE may detect the physical cell ID and perform power measurement. The UE may construct the list of candidate cells for the detected physical cell IDs.

The UE may perform MIB decoding for all candidate cells on the basis of the constructed list of candidate cell IDs.

Upon receiving USIM information and the list of candidate cells, the UE may determine which cell is the best cell appropriate for UE camp-on, and may perform system information and registration processes.

1.3 Problems of mmWave

An existing ray scanning scheme has a small cell boundary due to the omniantenna property of mmWave and a resolvable ray is eventually detected from a small cell area only. Hence, how to raise the probability of detection of a resolvable ray without the help of a beamforming gain on ray scanning is a major problem. Moreover, since a mmWave link sensitively changes in a link environment according to a location environment of a user equipment, acquisition of site-specific initial environment information is a major problem as well.

Figure 2:
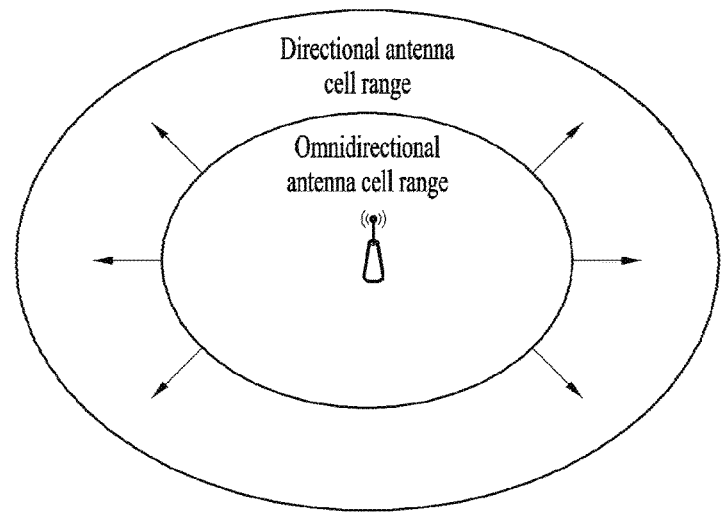
FIG. 2 is a diagram illustrating one example of cell radiuses that can be covered by an omnidirectional antenna and a directional antenna, respectively.

FIG. 2 is a diagram showing one example of cell radiuses that can be covered by an omnidirectional antenna and a directional antenna, respectively.

Referring to FIG. 2, a range of a cell covered by an omnidirectional antenna is wider than a cell range covered by a directional antenna. When a directional antenna is used in mmWave, there is a problem that a range gain of a beamforming is reduced by about −20 dB. Hence, although it is preferable to use an omnidirectional antenna, a case of mmWave has a problem that channel characteristic rapidly changes according to a user location.

There are the above-mentioned problems due to the property of the mmWave technology that uses the omnidirectional antenna. Therefore, the present invention is directed to overcome the above problems and propose methods of increasing a cell range coverable by an omni-directional antenna up to a range covered by a directional antenna.

2. Scanning Method for Directional Antenna 2.1 Beam Scanning Method

Beam scanning methods are schematically described as follows.

Figure 3:
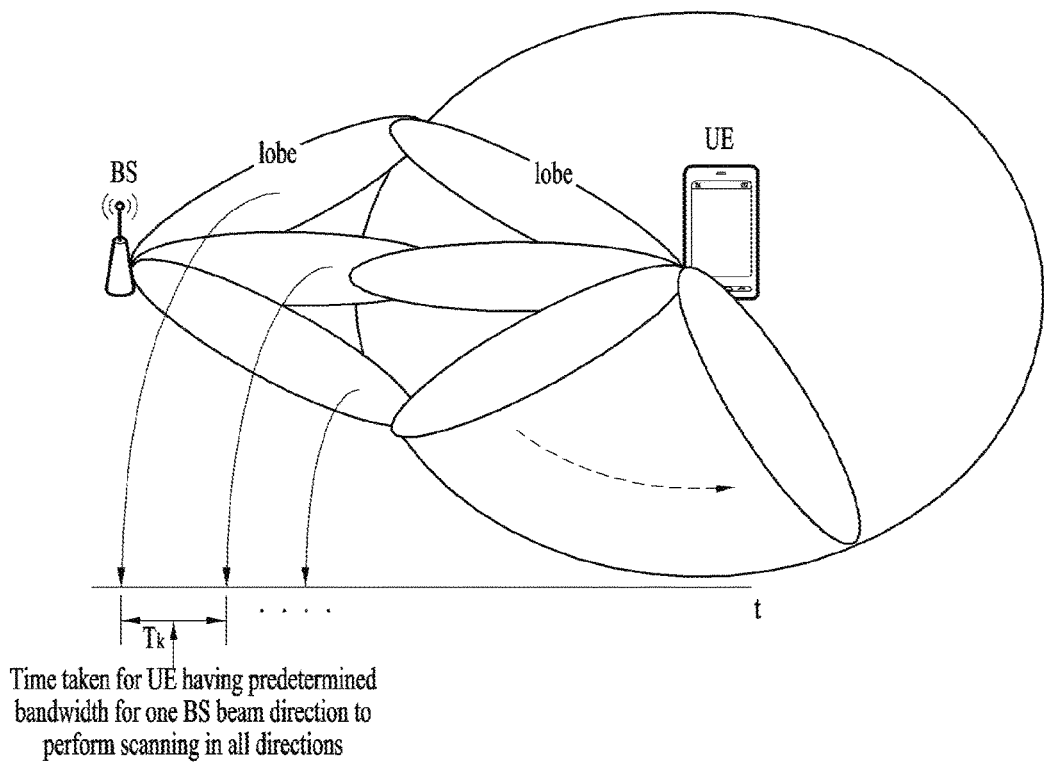
FIG. 3 is a diagram illustrating one example of an initial stage of a received beam scanning for transmitted beam scanning.
Figure 4:
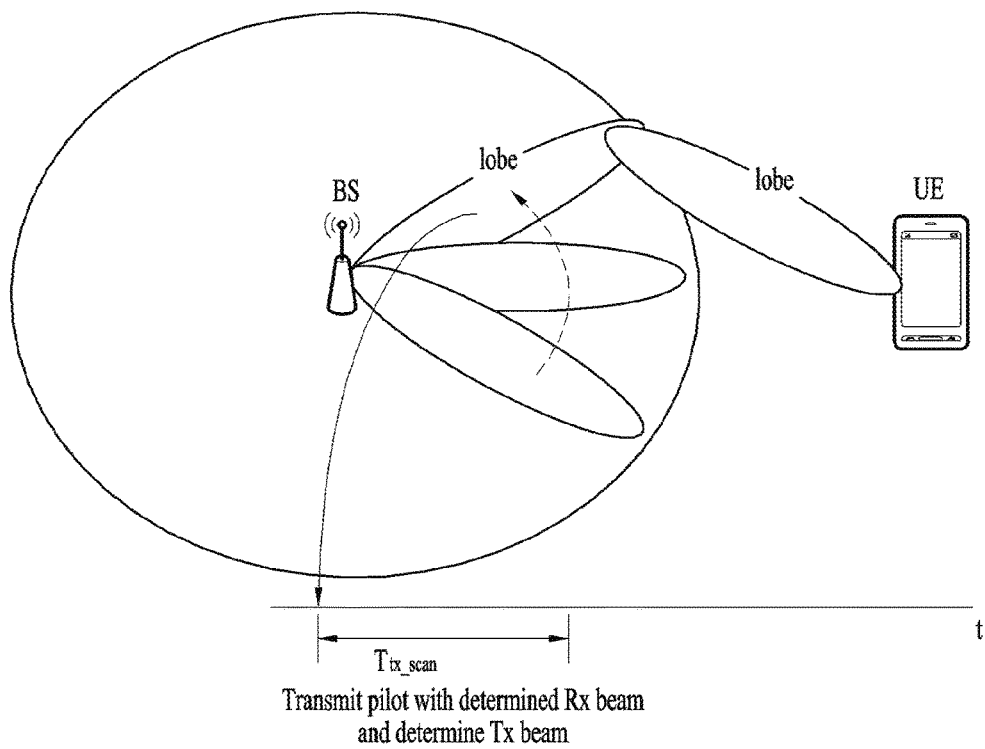
FIG. 4 is a diagram illustrating one of methods for performing beam scanning in a transmitting end after fixing a received lobe index in a receiving side.

FIG. 3 is a diagram showing one example of an initial stage of a received beam scanning for a transmitted beam scanning. FIG. 4 is a diagram showing one of methods for performing a beam scanning in a transmitting end after fixing a received lobe index in a receiving side.

If a transmitted beam codebook of a base station is determined in an initial stage of a beam scanning, while a corresponding transmitted beam is fixed, a receiving side, i.e., a user equipment derives a PDP (power delay profile) according to each beam by rotating a received beam scanning at 360°. In this case, the user equipment selects an index of a received lobe having a ray with a biggest power among the detected PDPs. Herein, the lobe means each radiation group in case that energy distribution of electric waves radiated from an antenna is divided in several directions. Namely, it means a prescribed form of a beam in performing a beam scanning.

Formula 1 is used to calculate SNR of each lobe detected by a user equipment.

$$\arg\max_{i\ w_i} |H_i^{(k)} w_i|^2 \frac{p_i^2}{\sigma_n^2} \quad \text{[Formula 1]}$$

In Formula 1, $H_i^{(k)}$ means a radio channel of an $i^{th}$ lobe for a transmitted beam k, $w_i$ means a precoding matrix, $p_i$ means a received power, sigma ($\sigma$) means a size of noise, sigma square means a power of noise.

When a time for completing a received (Rx) beam scanning for a fixed transmitted (Tx) beam lobe is defined as $\tau_k$, as shown in FIG. 3, $\tau_k$ value may be defined as Formula 2.

$$\tau_k = N(\tau_{excess\_delay} + \tau_{prop\_delay} + \tau_{process\_delay}) \quad \text{[Formula 2]}$$

In Formula 2, $\tau_{excess\_delay}$ is an excess delay spread value meaning a maximum delay time required for a receiving end to perform a beam scanning repeatedly, $\tau_{prop\_delay}$ is a transmission delay value, $\tau_{process\_delay}$ means a PDP measurement time for each received (Rx) beam lobe and a strong ray detection time, and N means the number of receiving side beam lobes.

The receiving end repeats the above process by changing the entire transmitted (Tx) beam lobes 1~K at 360°. Hence, a beam scanning complete time of the receiving end is $K\tau_k$. Herein, K means the number of the entire transmitted (Tx) beams.

Referring to FIG. 4, if a user equipment that is a receiving end completes a beam scanning, it sends a pilot signal to a mmWave base station again. Thereafter, the user equipment performs 360° beam scanning to determine a transmitting side lobe index. Hence, a time of completing a Tx/Rx beam scanning becomes $K\tau_k + \tau_{tx\_scan}$.

Table 4 defines parameters for beam scanning complete time measurement.

TABLE 4

| | |
|---|---|
| $\tau_{excess\_delay}$ | 1 us |
| $\tau_{prop\_delay}$ | 5 us |

TABLE 4-continued

| | |
|---|---|
| $\tau_{process\_delay}$ | 670 us |
| N (beamwidth = 36 degree) | 100 (vertical + horizontal) |
| K (beamwidth = 36 degree) | 100 (vertical + horizontal) |
| $\tau_{tx\_scan}$ | 100 * 670 us |

If parameters for a beam scanning are defined as Table 4, a total Tx/Rx beam scanning time becomes about 100*100*(1+5+670)+100*670=6.827 sec. Namely, it can be observed that overhead amounting to a considerably long time is generated.

Yet, channel characteristic varies according to user's instant motion in a narrow cell coverage due to mmWave property. If almost 7 seconds are consumed for the beam scanning, it causes a problem that a mmWave service appropriate for the varying channel characteristic cannot be provided. Therefore, for a mmWave link connection through a general beam scanning, a simpler processing method is required.

2.2 Ray Scanning Method

Figure 5:
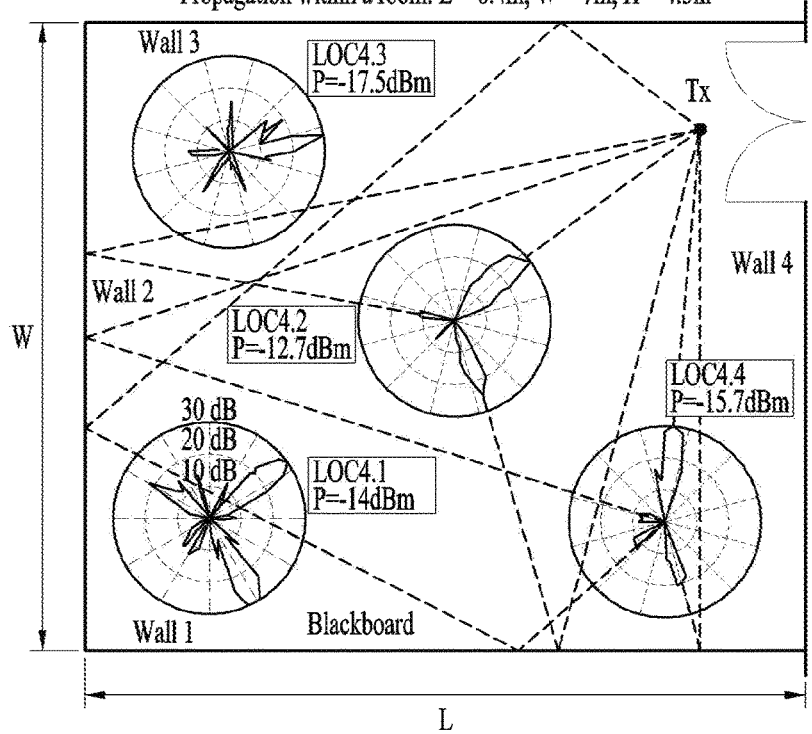
FIG. 5 is a diagram illustrating one example of PAS distribution according to a location of each transceiving end in a 60 GHz band.
Figure 5:
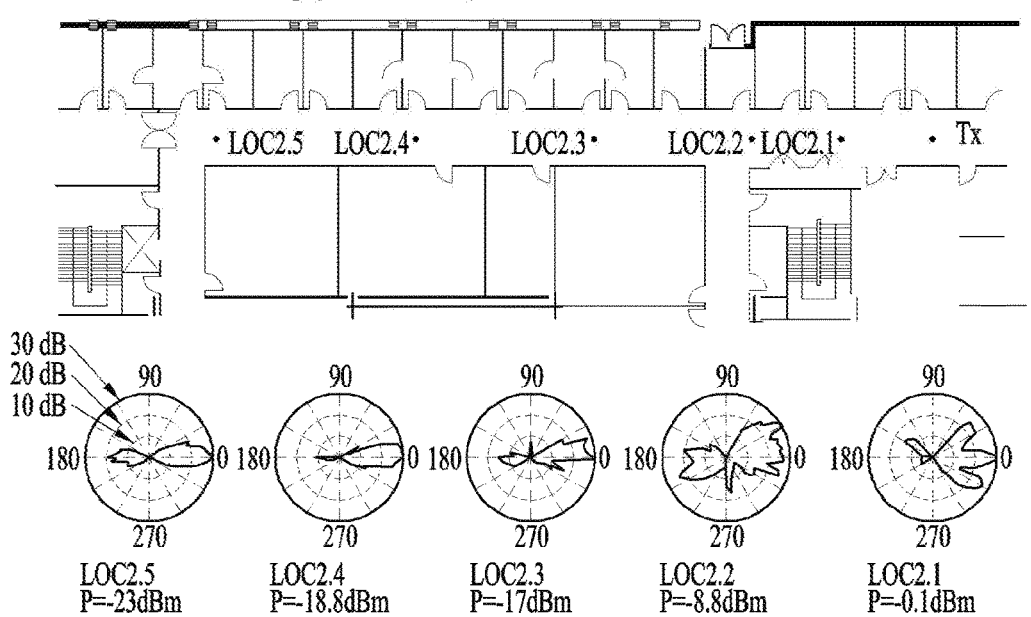

FIG. 5 is a diagram showing one example of PAS distribution according to a location of each transceiving end on 60 GHz band. Particularly, FIG. 5 (a) shows a measurement state of indoor AoA (angle of arrival) and FIG. 5 (b) shows a measurement state of AOA on a corridor in a building.

Like FIG. 5, according to the space environment property of a reception location. it can be observed that PAS indicating a power amount according to an antenna angle of a user equipment changes variously. In mmWave using a high frequency band, the environmental property of the user equipment appears more clearly in comparison with a low frequency band.

Figure 6:
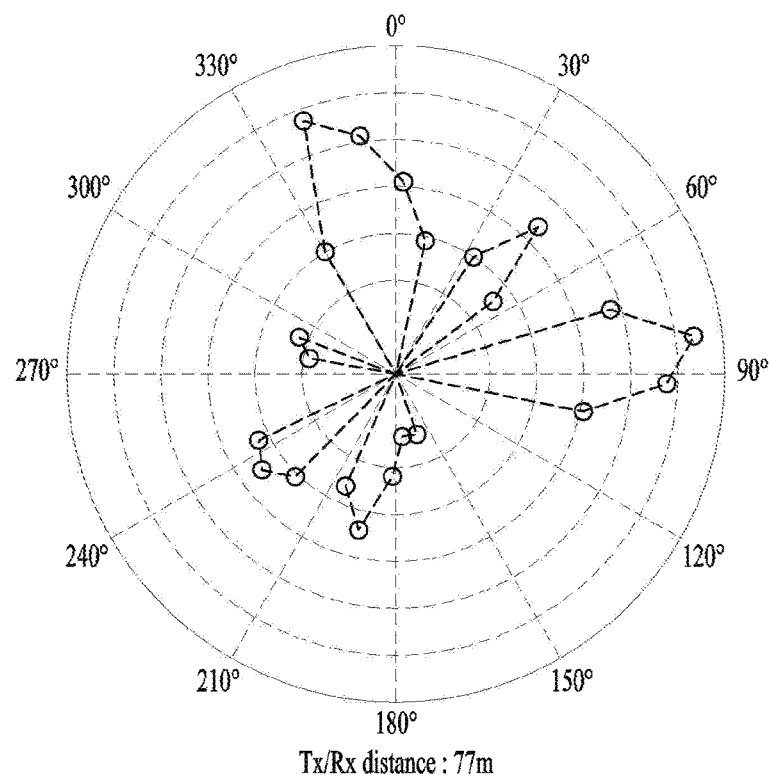
FIG. 6 is a diagram illustrating one example of PAS distribution according to a location of each transceiving end in a 28 GHz band.
Figure 6:
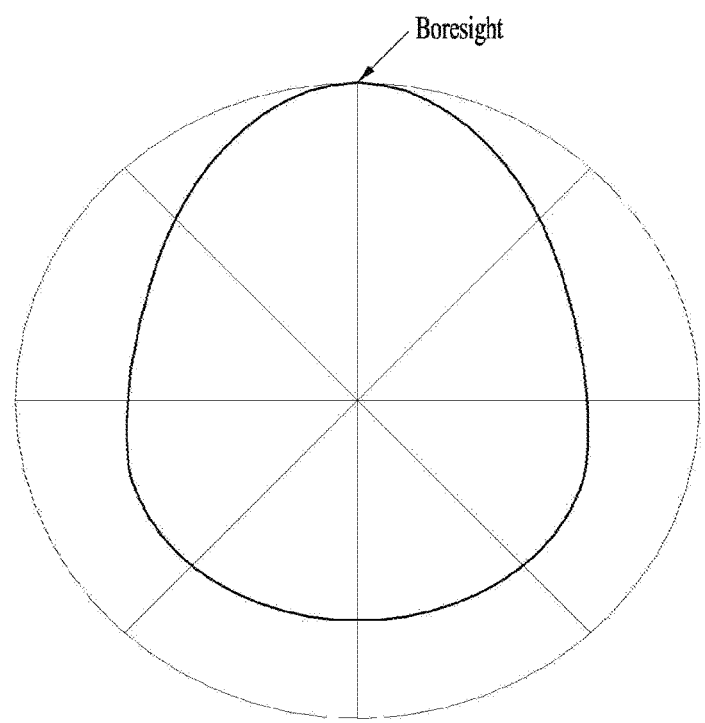

FIG. 6 is a diagram showing one example of PAS distribution according to a location of each transceiving end on 28 GHz band. FIG. 6 (a) shows a PAS measurement result in a city area corresponding to NLoS (non line of sight) environment and FIG. 6(b) shows a PAS measurement result in a general LoS (line of sight) environment.

Through measurement, Rappaport team shows that PAS is determined according to regional location features of a receiver in NLoS environment (i.e., situation that link is connected owing to reflection and refraction by buildings, etc.) on 28 GHz band similar to 60 GHz band. Such a result predicts that a reception power is sufficiently reduced if AoA is further twisted with reference to boresight in a general LoS environment and that a reception power change will appear for each AoA according to the environmental features.

Therefore, if a mmWave user equipment analyzes the unique features for a wireless environment through a scanning scheme based not on beamforming but on ray scanning, such an analysis can be usefully used as a tool for obtaining a lobe of a space candidate or the like on a beam scanning or providing information to enable a receiver to detect resolvable rays distributed variously.

2.3 Relation between Unique Environmental Element (PDP/PAS) and Directional Antenna Using a directional antenna and beamforming in a mmWave system obtains a beam gain and should be basically accompanied to extend a mmWave cell boundary restricted by the mmWave unique property. Yet, the unique property of the mmWave link is changed due to the use of the directional antenna and the beamforming.

Figure 7:
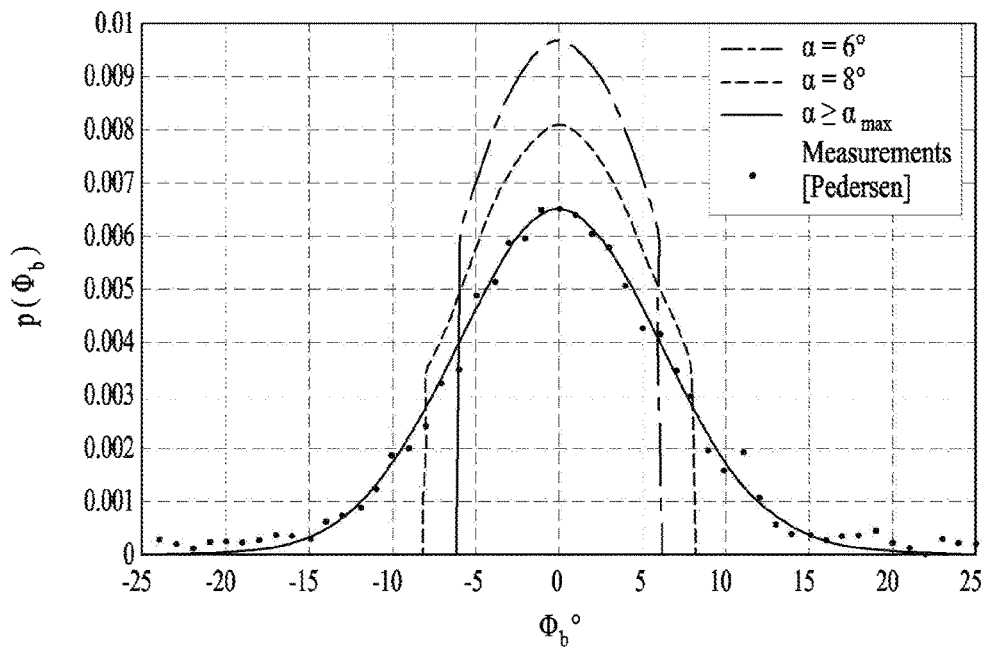
FIG. 7 is a diagram illustrating one example of effect for a directional antenna in a mmWave system.
Figure 7:
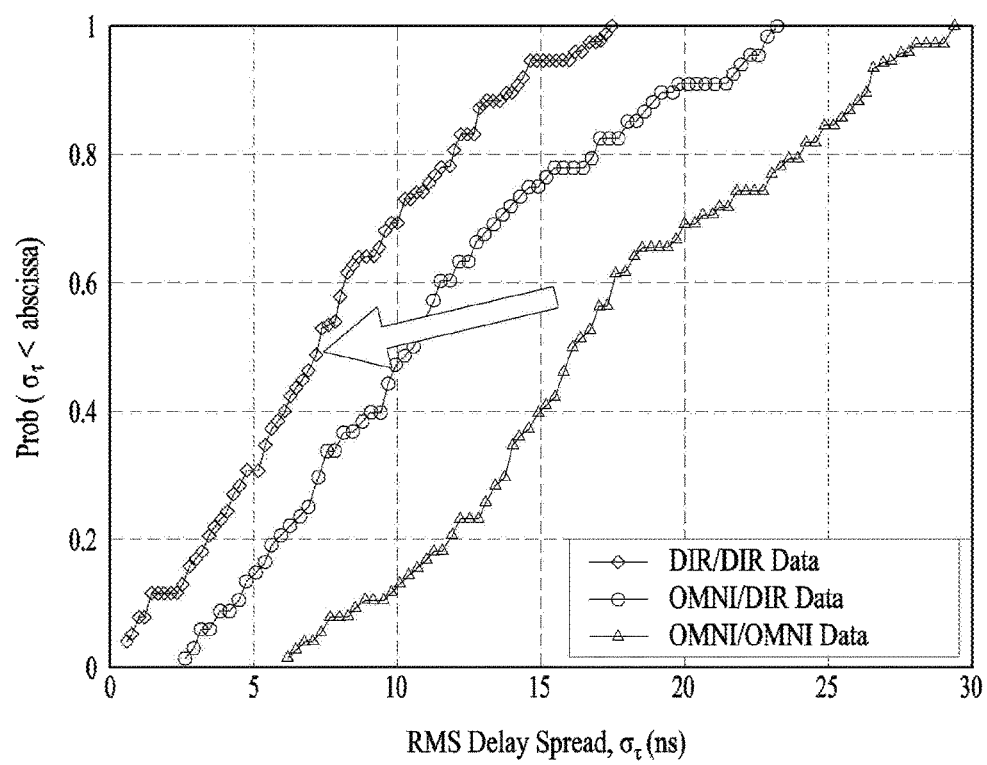

FIG. 7 is a diagram showing one example of effect for a directional antenna in a mmWave system. Particularly, FIG. 7 (a) shows a variation of PAS according to bandwidth, and FIG. 7 (b) shows RMS DS change by a directional antenna.

In FIG. 7 (a), a means a bandwidth. Generally, PAS has distributions of laplacian/uniform/Gaussian and the like according to the environmental features. Yet, since a range of the bandwidth is restricted due to the use of the directional antenna and the beamforming, the distribution is changed into truncated laplacian/Gaussian or the like.

Due to the limited AoA like FIG. 7 (b), a delay spread value is reduced as well. Hence, the environmental property in using a beamforming in a mmWave link cannot be regarded as the unique mmWave link environmental property.

Hence, for the environmental property analysis and information acquisition of the unique mmWave link, an omnidirectional antenna based ray scanning method is required.

2.4 Hierarchical Beam Scanning Method

Figure 8:
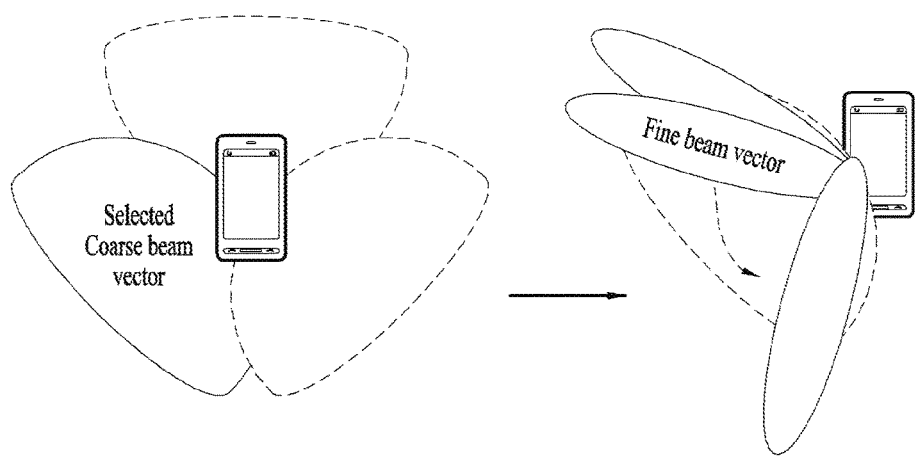
FIG. 8 is a diagram illustrating one example of hierarchical beam scanning methods.

FIG. 8 is a diagram illustrating one example of hierarchical beam scanning methods.

The hierarchical beam scanning method is a method for selecting a coarse beam vector and then reducing an overall scanning time using a fine beam vector.

The following Table 5 defines parameters needed to measure the hierarchical beam scanning completion time.

TABLE 5

| | |
|---|---|
| $\tau_{excess\_delay}$ | 1 us |
| $\tau_{prop\_delay}$ | 5 us |
| $\tau_{process\_delay}$ | 670 us |
| $N_{Coarse}$ (beamwidth = 120 degree) | 9 (vertical + horizontal) |
| $N_{fine}$ (beamwidth = 30 degree) | 16 per one coarse beam (vertical + horizontal) |
| K (beamwidth = 36 degree) | 100 (vertical + horizontal) |
| $\tau_{tx\_scan}$ | 100 * 670 us |

Referring to FIG. 8, the UE may decide a coarse beam having a range of 120 degrees. Thereafter, scanning of the fine beam vector may be confirmed within the selected coarse beam. When using the hierarchical beam scanning method, the hierarchical beam scanning completion time may be decided as shown in the following formula 3.

$$\tau_k = (N_{Coarse} + N_{fine}) \times (\tau_{excess\_delay} + \tau_{prop\_delay} + \tau_{process\_delay})$$ [Formula 3]

In consideration of Table 5 and Formula 3, a total time in which the UE performs hierarchical beam scanning may be reduced to 100*(9+16)*676+100*670=1.757 sec. Compared with general beam scanning, the total scanning time is reduced. However, because the coarse beam vector is post-processed, the selected coarse beam vector cannot be utilized during scanning for the fine beam vector. In addition, the beam is pre/post-processed during transmission/reception (Tx/Rx) times, such that the hierarchical beam scanning method may have difficulty in determining unique characteristics of each channel.

3. Positioning Method of LTE/LTE-A System 3.1 Position Estimation Method

The following Table 6 illustrates methods for estimating UE position information used in LTE/LTE-A.

TABLE 6

| Items | Content |
|---|---|
| Satellite based position estimation | A-GNSS (Assisted Global Navigation Satellite Systems) GPS and GLONASS based estimation method |
| Mobile cellular estimation | OTDOA (Observed Time Difference of Arrival) eCID (enhanced Cell ID) |
| Hybrid estimation method | Hybrid-GNSS or GNSS + Mobile cellular estimation method |
| Control plane and User plane session handling | LPP, SUPL 2.0 |

Methods for estimating position information shown in Table 6 will hereinafter be described.

A Global Navigation Satellite System (GNSS) may receive a satellite signal using a satellite system (GPS or GLONASS), such that the GNSS may measure the UE position. However, signal reception failure may occur in the GNSS system according to UE position, resulting in a position estimation problem.

In order to improve the above system, assisted GNSS (A-GNSS) has recently been introduced. A-GNSS may be a method for receiving information related to the UE position over the network so as to overcome the GNSS reception problem that GNSS reception is considerably changed according to UE position. However, the A-GNSS system may also have disadvantages in that UE position accuracy is greatly changed according to UE environment (e.g., a user is in a building).

However, A-GNSS may use GNSS by LTE network assistance, such that the estimation calculation processing speed is faster than the legacy GNSS. Generally, the position estimation accuracy is in the range of 10 to 50m. The accuracy of the GPS service is directly associated with cost problems.

Observed Time Difference of Arrival (OTDOA) scheme may allow the UE to estimate its own position by measuring a difference in signal reception between at least two or at least three BSs. For example, in association with a serving cell (i) and a neighbor cell (j), the UE may measure a Reference Signal Time Difference (RSRD) value between PRSs using Positioning Reference Signals (PRSs) in subframes corresponding to the respective cells, such that the UE may estimate its own position.

Whereas OTDOA can be used in the indoor or urban environment, GNSS cannot be used in the indoor or urban environment. Enhanced Cell ID (E-CID) scheme may estimate the UE position using geographical characteristic information of the serving base station (BS). The serving BS information may be acquired through paging in a Tracking Area Group (TAG). E-CID may be used as the following three schemes (1), (2), and (3). The first scheme (1) may refer to E-CID scheme acquired through estimation of the distance from a single BS. The second scheme (2) may refer to E-CID scheme through estimation of the distance from three BSs. The third scheme (3) may refer to E-CID scheme acquired through estimation of Angle of Arrival (AoA) from at least two (preferably, three) BSs. The first and second schemes (1) and (2) may use UE signaling to measure Reference Signal Received Power (RSRP), TDOA, Time Advance (TA) or Round Trip Time (RTT). The third scheme (3) may allow the BS to estimate the UE position. Although the third scheme (3) can allow the BS to more rapidly estimate the UE position as compared to the other schemes (1) and (2), the first and second schemes (1) and (2) may also be used in consideration of the degree of position estimation precision.

In accordance with Type-2 transmission of the TA measurement method, the base station (BS) may receive a Physical Random Access Channel (PRACH) preamble, and may measure and estimate the UE position. In accordance with Type-1 transmission of the TA measurement method, a difference in Tx/Rx time between the BS and the UE is measured and calculated. RTT scheme may calculate a time duration in which the BS transmits a pilot signal and then receives the pilot signal, such that the UE position can be calculated. In this case, the distance of the UE may be estimated as $$d = c\frac{RTT}{2},$$

where 'c' is the speed of light.

RTT and TA are metrics for distance estimation, and are not used to measure the position information. However, AoA has directional information related to the position, such that the AoA may be a measurement parameter to be sufficiently considered. AoA measurement may include a method for allowing the UE to measure a signal to be applied to the UE and a method for measuring a signal from the UE to the BS and estimating the measured signal. The latter case may perform estimation in an uplink (UL) connection state. Antenna directional characteristics may affect AoA measurement during AoA measurement, such that the antenna beam pattern situation must be considered to increase measurement accuracy.

3.2 Positioning Reference Signal (PRS)

Figure 9:
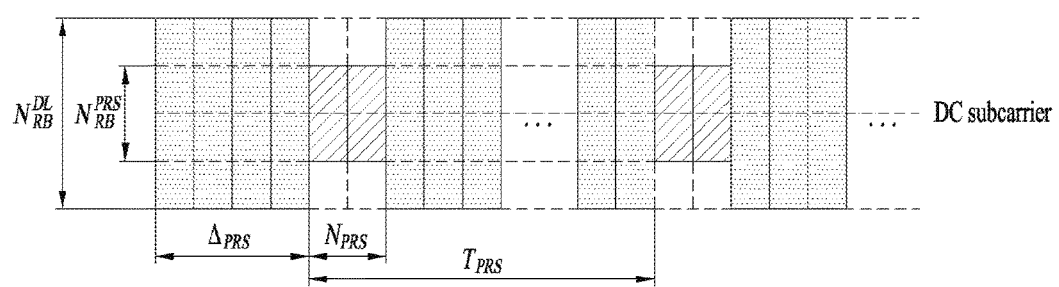
FIG. 9 is a conceptual diagram illustrating one example of a positioning reference signal (PRS).

FIG. 9 is a conceptual diagram illustrating one example of a positioning reference signal (PRS).

PRS is similar to a cell-specific reference signal (RS), such that the PRS may be a reference signal (RS) for estimating the UE position in consideration of the interference-free environment. PRS is designed as a pseudo-random Quadrature Phase Shift Keying (QPSK) sequence that is mapped in a diagonal pattern having a spatial frequency shift.

Referring to FIG. 9, PRS may be allocated to a bandwidth smaller than the actual system bandwidth, and is mapped to the vicinity of a DC subcarrier. In order to reduce inter-cell interference (ICI), the PRS is not transmitted at a certain moment. LPP protocol for PRS transmission may be performed in a location server. In FIG. 9, $N_{PRS}$ is the number of PRS subframes, $N_{RB}^{PRS}$ is the number of PRB RBs, $T_{PRS}$ is a period, and $\Delta_{PRS}$ is an offset value.

3.3 Necessity for Providing UE Position Information in mmWave System

Figure 10:
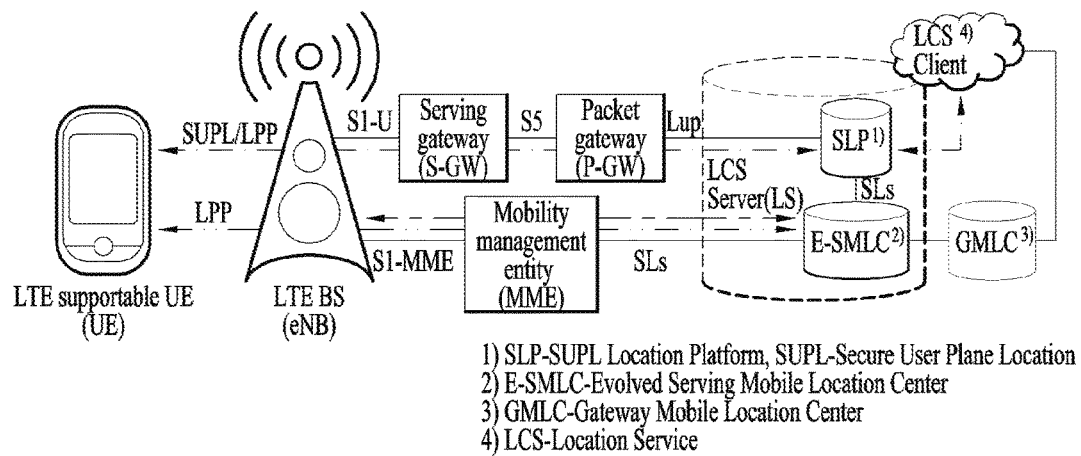
FIG. 10 is a diagram illustrating an E-UTRA position network used in LTE/LTE-A.

FIG. 10 is a diagram illustrating an E-UTRA position network used in LTE/LTE-A.

Referring to FIG. 10, the positioning network structure used in LTE/LTE-A can be confirmed. An LCS (LoCation Server) may receive UE position information from each BS, may process the received UE position information, and may estimate the UE position.

The LCS client may request the UE position only in an urgent or emergency situation, because the UE position is connected to the privacy problem of each user. However, the channel situation is abruptly changed according to the UE position in the mmWave system, such that there may occur an unexpected situation in which UE position information is estimated and acquired and is then used for mmWave link stabilization. The mmWave system is generally used in a high-frequency band as described above, such that the mmWave system may be easily affected by the link environment as compared to low frequency. In order to overcome mmWave cell coverage, fine beamforming will be introduced. Therefore, when mmWave characteristics are considered, there is a higher possibility that the UE position information can be used for mmWave link stabilization. Therefore, the scope of application of the LCS server may be further increased.

The UE position information may be used in the following three scenarios (1), (2), and (3). Here, the first scenario (1) may refer to the mmWave beam scanning process (i.e., initial cell access), the second scenario (2) may refer to the mmWave beamforming process (i.e., after cell access), and the third scenario (3) may refer to the case in which mmWave link characteristics based on the UE position are provided in advance and are then used for link stabilization.

4. Scanning Method Based on UE Position Information in mmWave System 4.1 Basic Assumption for mmWave Scanning Embodiments of the present invention relate to methods for applying UE position information supported by LTE/LTE-A to the mmWave scanning.

Specifically, mmWave TAG (tracking area group) is established to guarantee multiple LoS mmWaves, and mmWave scanning complexity can be reduced using position information between mmWave UEs connected to the mmWave BS. For convenience of description, the LTE/LTE-A system will hereinafter be referred to as a legacy system. The embodiments of the present invention may establish the mmWave TAG (Tracking Area Group) to acquire multiple LOS (Line of Sight) values for the UE. In this case, mmWave scanning complexity can be reduced using position information between the mmWave UEs connected to the mmWave BS.

Basic assumptions (1), (2), and (3) for performing the embodiments of the present invention are as follows.

(1) In order to acquire the LoS link, it is assumed that the mmWave BSs and the mmWave UE have capability for multiple joint transmission. That is, it is assumed that the mmWave UE and the mmWave BSs can support Comp capable of being collectively transmitted from multiple serving cells or Dual Connectivity (DC) in which RRC is connected to at least two serving cells.

Figure 11:
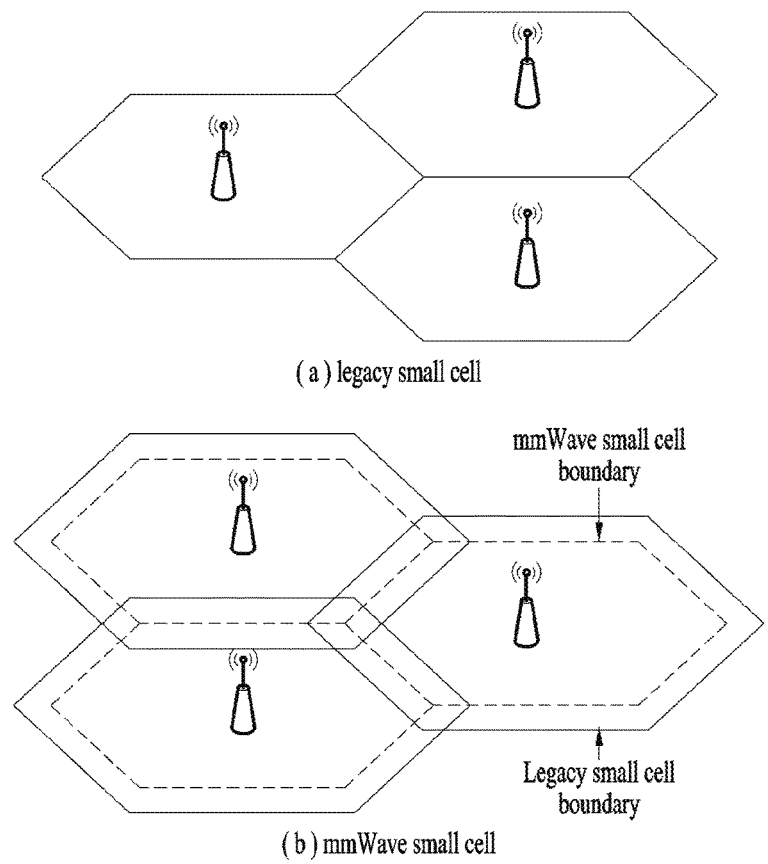
FIG. 11 is a conceptual diagram illustrating comparison in layout structure between a legacy cell and a mmWave cell.

(2) In order to overcome mmWave link instability caused by LoS/NLoS transition, human obstacle, human body impact of the reception (Rx) user, the positions of mmWave BSs may be more densely located than the legacy small cell position. FIG. 11 is a conceptual diagram illustrating comparison in layout structure between the legacy cell and the mmWave cell. FIG. 11(a) illustrates the layout structure of the legacy small cell. FIG. 11(b) illustrates the layout structure of the mmWave small cell. It can be confirmed that the mmWave small cells are more densely arranged.

(3) The mmWave PCell and the legacy PCell may be established in different ways. That is, one UE may be connected to the legacy PCell, and at the same time may also be connected to the mmWave PCell. Alternatively, assuming that the UE capability can support both the legacy PCell and the mmWave PCell, connection between the legacy PCell and the mmWave PCell may be established in different ways as necessary. In the above cases, a PCell for the mmWave system and a PCell for the legacy system may be separately configured in different ways.

Figure 12:
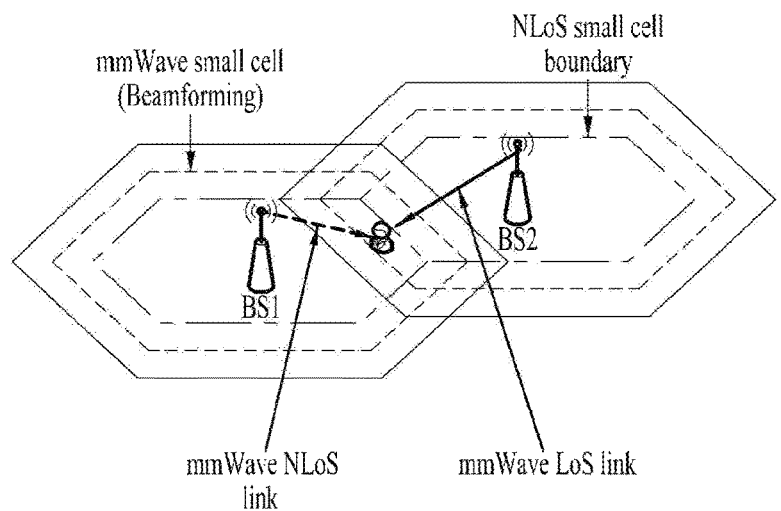
FIG. 12 is a conceptual diagram illustrating a mmWave NLoS link overlaid on a legacy PCell and a mmWave LoS link overlaid on a legacy S-Cell.

FIG. 12 is a conceptual diagram illustrating a mmWave NLoS link overlaid on a legacy PCell and a mmWave LoS link overlaid on a legacy S-Cell.

Referring to FIG. 12, the outermost cell boundary may refer to the cell boundary between the legacy small cells, and the intermediate cell boundary may refer to the cell boundary between the mmWave small cells. The innermost cell boundary may refer to the cell boundary between the NLoS small cells. In this case, one BS may manage the legacy small cell, the mmWave small cell, and/or the NLoS small cell.

In FIG. 12, the UE may be connected to the legacy small cell (i.e., the legacy PCell), and may be connected to the mmWave small cell (i.e., mmWave PCell). In this case, the UE may establish connection to different mmWave PCells and the legacy PCell. That is, as can be seen from FIG. 12, the UE may form the legacy link to a first BS (BS1) and the link between the mmWave link and the BS1 is in the NLoS state, the mmWave link may form the mmWave link with a second BS (BS2) having the LoS link.

However, assuming that the mmWave cell boundary is in the legacy cell boundary in the situation in which the UE is RRC-connected to the legacy system, and mmWave small cells are more densely arranged in the legacy cell boundary, it may be difficult to decide the mmWave PCell during mmWave link connection to be established by the UE. In this case, the mmWave PCell is always needed to properly cope with rapid change in mmWave link characteristics.

4.2 mmWave Scanning Method Using Position Information

Figure 13A:
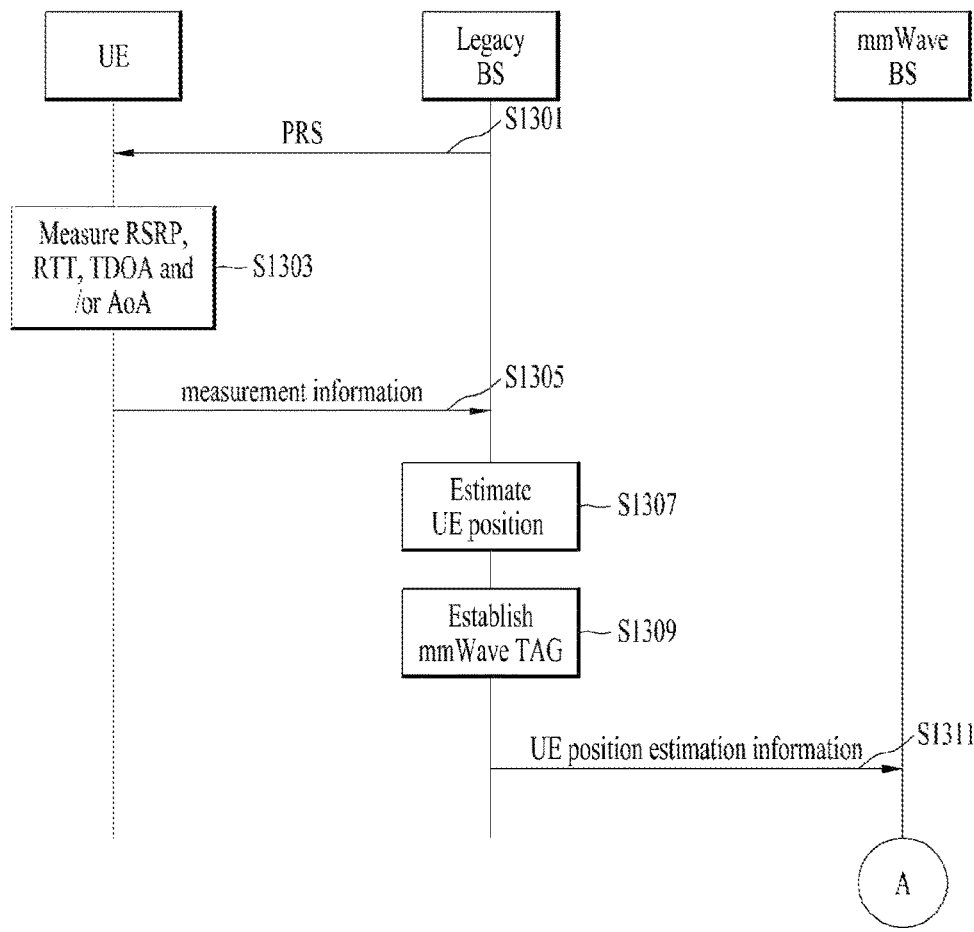
FIGS. 13A and 13B are flowcharts illustrating one example of methods for reducing complexity of mmWave scanning using UE position information.
Figure 13B:
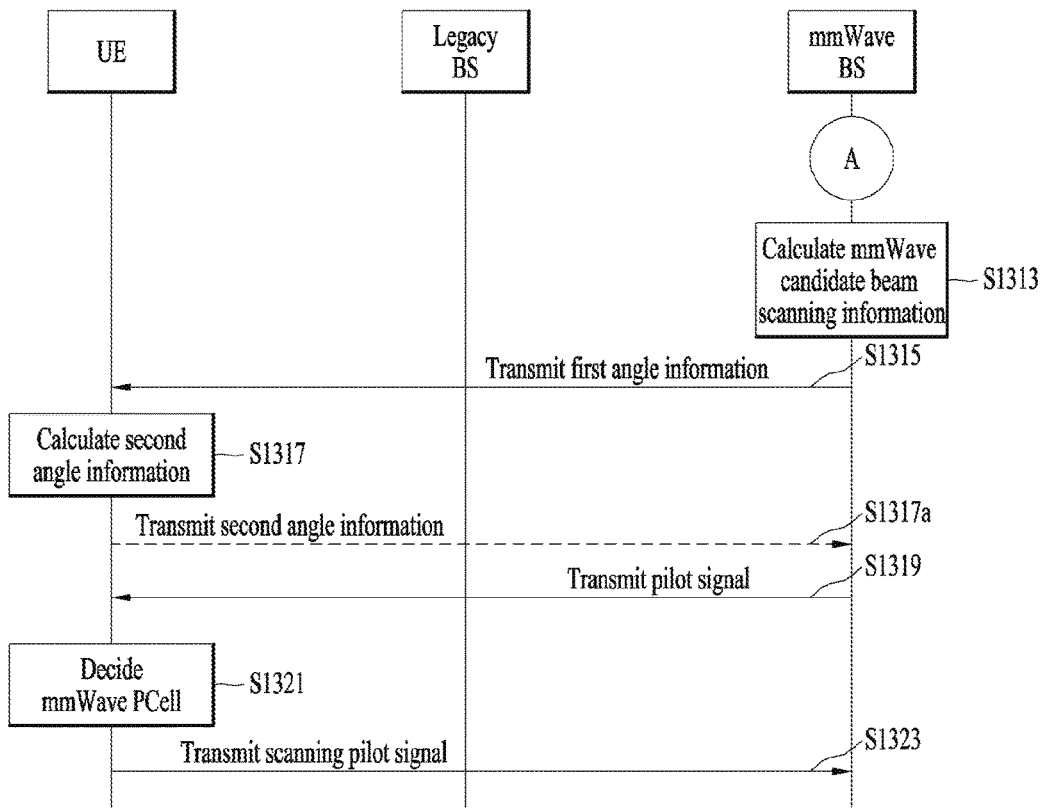

FIGS. 13A and 13B are flowcharts illustrating one example of methods for reducing complexity of mmWave scanning using UE position information.

Steps of FIG. 13 may be carried out on the above-mentioned assumption. In addition, the UE and the legacy BS may be RRC-connected to each other, and the UE and the BS may have legacy/mmWave band transmission capability. In addition, the UE may perform joint transmission to at least two BSs.

Referring to FIG. 13, in order to estimate the UE position information, the legacy BS belonging to the legacy TAG may transmit the PRS to the UE. In this case, the legacy BS may refer to the BS capable of supporting the legacy PCell (S1301).

The UE may receive the PRS, and thus measure RSRP, RTT, TDOA and/or AoA, etc. In this case, the method for measuring RSRP, RTT, TDOA and/or AoA may be disclosed in sections 3.1 and 3.2 (S1303).

The UE may transmit measurement information acquired from S1303 to the legacy BS. The measurement information may include RSRP, RTT, TDOA and/or AoA values (S1305).

The legacy BS may perform the positioning algorithm on the basis of measurement information received from the UE, and thus estimate the UE position (S1307).

In another aspect, the legacy BS may transmit measurement information received from the UE to the LCS server (S1307). That is, the LCS server may estimate the UE position, and may then transmit the UE position information to the legacy BS.

The legacy BS may establish the mmWave TAG on the basis of the estimated UE position information (S1309).

The legacy BS may transmit information regarding the mmWave BSs contained in the established mmWave TAG to the UE (not shown).

The legacy BS may transmit the estimated UE position information to the mmWave BSs contained in the established mmWave TAG (S1311).

The mmWave BSs may calculate mmWave candidate beamforming information on the basis of the received UE position information (S1313).

The UE position information provided from the legacy system may be incorrect due to UE position estimation error. However, the UE position must be very precise in the mmWave system, the correct UE position can be acquired through beam scanning. In this case, in order to reduce beam scanning overhead, beam scanning may be performed within the range of some angles instead of all directions (i.e., 360 degrees). That is, the UE and/or the BS may acquire information regarding the candidate scanning angles, resulting in reduction in scanning overhead. To this end, the mmWave BSs may determine mmWave candidate beam scanning information indicating the set of some angles to be used for beam scanning of the UE on the basis of UE position information.

In brief, for mmWave beam scanning, the UE and the BS may perform beam scanning in all directions of 360 degrees. However, according to the embodiments of the present invention, the UE and/or the BS may perform beam scanning within the candidate beam scanning set to be searched for, such that beam scanning overhead of the UE and/or the BS can be reduced.

Referring back to FIG. 13(*b*), the mmWave BSs may calculate mmWave candidate beam scanning information, and may transmit first angle information to the UE. In this case, the first angle information may denote the set of candidate angles for BS beam scanning to be received by the UE (S1315).

The mmWave UE may calculate second angle information indicating the set of candidate angles of the beam, that is ready to transmit the mmWave pilot signal for beam scanning to the mmWave BS on the basis of the first angle information. That is, the second angle information may denote candidate angle information through which the UE is scheduled to transmit pilot signals to the BS for beam scanning (S1317).

In one aspect of the present invention, the UE may transmit the calculated second angle information to the mmWave BSs (S1317*a*). In another aspect of the present invention, the second angle information may be calculated by the mmWave BSs on the basis of the first angle information generated from S1313 (not shown).

The mmWave BSs may transmit the pilot signal for ray scanning and/or the pilot signal for beam scanning to the UE according to the legacy Tx timing (S1319).

The UE may perform ray scanning or beam scanning on the basis of the first angle information, such that the UE may measure power values of the mmWave pilot signals transmitted from the mmWave BSs. The UE may decide the mmWave PCell within the mmWave TAG on the basis of the measured power information (S1321).

The UE may decide a candidate beam scanning subset on the basis of the second angle information calculated in step S1317, and may transmit a pilot signal for beam scanning within the corresponding subset (S1323).

After the UE determines the mmWave PCell through ray scanning or beam scanning on the basis of the first angle information in step S1321, the UE transmits the pilot signal to the corresponding mmWave PCell on the basis of second angle information, such that the mmWave PCell BS and the UE may search for the most appropriate beam.

In FIG. 13, the order of S1317 and S1319 may be changed in reverse order. For example, the UE may detect the pilot signal through beam scanning upon receiving the first angle information from the mmWave BSs, may select the most appropriate mmWave PCell, and may calculate second angle information only for the corresponding PCell. In this case, UE processing overhead can be more greatly reduced as compared to the above-mentioned method, resulting in reduction in UE power consumption.

Although only one mmWave BS is shown in FIG. 13, a plurality of mmWave BSs may be arranged. In this case, methods of FIG. 13 may be carried out by the respective mmWave BSs.

Steps of FIG. 13 will hereinafter be described.

4.3 mmWave TAG Setting Method

Prior to execution of mmWave scanning, the legacy BS may establish the mmWave TAG to acquire the mmWave candidate beam scanning information. The following mmWave TAG setting methods may be carried out in step (S1309).

4.3.1 mmWave TAG ID Setting Method

Figure 14:
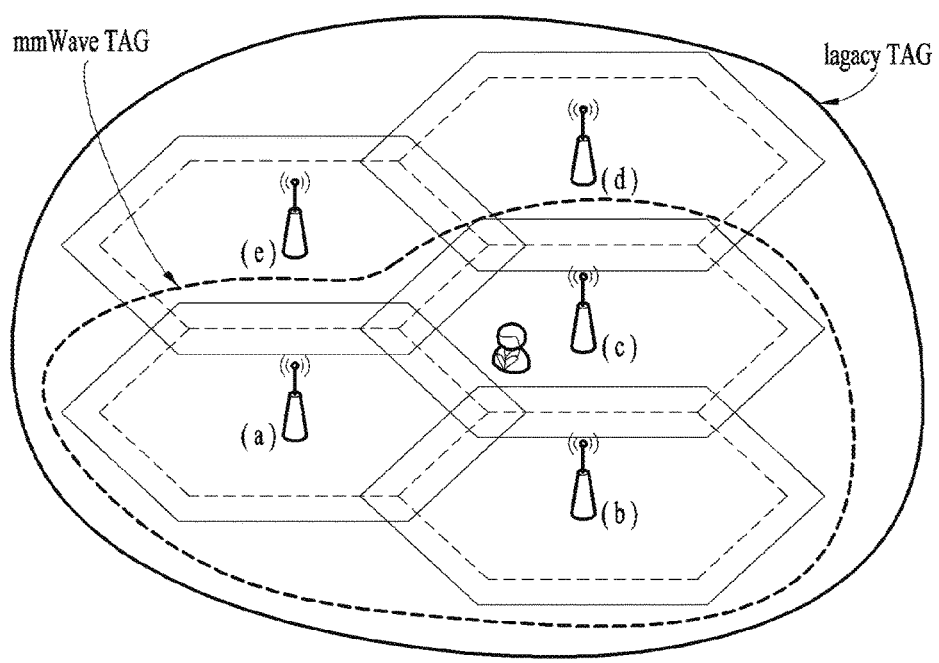
FIG. 14 is a conceptual diagram illustrating one example of methods for establishing legacy base stations (BSs) to a mmWave TAG according to UE position.

The legacy BS may establish the legacy TAG to the mmWave TAG indicating a combination of the respective BSs according to the UE position acquired from UE position information. FIG. 14 is a conceptual diagram illustrating one example of methods for establishing legacy base stations (BSs) to the mmWave TAG according to UE position. In FIG. 14, a bold solid line may denote the legacy TAG, and a dotted line may denote the mmWave TAG.

The following Table 7 shows one example of methods for establishing the legacy BSs to the mmWave TAG according to the UE position.

TABLE 7

| mmWave TAG ID | Decide three mmWave BSs from among 5 mmWave BSs |
|---|---|
| 0 | (a), (b), (c) |
| 1 | (a), (b), (d) |
| 2 | (a), (b), (e) |
| 3 | (a), (c), (d) |
| 4 | (a), (c), (e) |
| 5 | (a), (d), (e) |
| 6 | (b), (c), (d) |
| 7 | (b), (c), (e) |
| 8 | (b), (d), (e) |
| 9 | (c), (d), (e) |

That is, the BS may select the legacy TAG on the basis of the UE position, and 3 BSs from among 5 BSs contained in the corresponding legacy TAG may be established as the mmWave TAG. In this case, 3 BSs from among 5 BSs may be established as the mmWave TAG according to the combination scheme.

In addition, the BS may transmit the mmWave TAG ID of the established mmWave TAG sets to the UE, such that the BS may indicate which mmWave TAG includes the UE. For example, the legacy BS may transmit a mmWave TAG ID index regarding the most appropriate mmWave TAG for the UE from among the established mmWave TAG sets to the UE.

4.3.2 mmWave TAG Setting Method Through Power Measurement

The legacy BS may establish the mmWave TAG on the basis of power measurement information (e.g., RSRP or PSSI) regarding the legacy links. That is, the mmWave TAG may be established on the basis of measurement information transmitted from the UE in step S1305.

In this case, the UE may calculate the degree of additional power loss caused by a frequency difference through Friis formula. The following formula 4 may show one example of Friis Formula.

$$P_{RX} = \left(\frac{\lambda}{4\pi \cdot d}\right)^2 \cdot P_{TX} = \left(\frac{c}{4\pi \cdot f \cdot d}\right)^2 \cdot P_{TX} \quad \text{[Formula 4]}$$

In Formula 4, $\lambda$ is a wavelength of the Rx signal, c is speed of light, and f is a carrier frequency. In this case, the mmWave link estimation power may be calculated as shown in the following formula 5.

$$\hat{P}_{Rx,mmWave} = P_{Tx,mmWave} - (P_{Tx,legacy} - P_{Rx,legacy}) \pm \text{ad-d\_loss}_{freq}. \quad \text{[Formula 5]}$$

In Formula 5, add_loss$_{freq}$ is additional attenuation power loss caused by a frequency difference, $P_{Tx,legacy}$ is a legacy Tx power, $P_{Rx,legacy}$ is a legacy pilot Rx power, $P_{Tx,mmWave}$ is a mmWave Tx power, and $\hat{P}_{Rx,mmWave}$ is a mmWave Pilot Rx estimation power.

Example for deciding a threshold α is as follows. In this case, the example for deciding a threshold value α may be defined as the following formula 6.

$$\hat{d}_m = \arg_{d_m}[SNR_{Rx(min\_detectable)} - P_{Tx} + \quad \text{[Formula 6]}$$

$$PL(d_m) + (NF + 10\log_{10}(BW)) = 0]$$

$$\alpha = P_{Tx} - PL(\hat{d}_m)$$

$$\beta_{min} = \alpha - G_{tx\_max} - G_{rx\_max}$$

In Formula 6, $P_{Tx}$ is a mmWave BS Tx power, PL($d_m$) is a path loss function for Distance (meter), NF is a Noise Floor (−174 dBm/Hz at room temperature 290 k), BW is a Tx frequency band. SNR$_{Rx(min\_detectable)}$ is a minimum Rx SNR for detecting the mmWave pilot signal power, and $\beta_{min}$ is the cell range during mmWave beamforming. Therefore, the legacy BS having $\hat{P}_{Rx,mm,Wave} \geq \beta_{min}$ may be included in the mmWave TAG.

4.4 Method for Calculating mmWave Candidate Beam Scanning Information

A method for calculating the mmWave candidate beam scanning information performed in S1313 will hereinafter be described.

Figure 15:
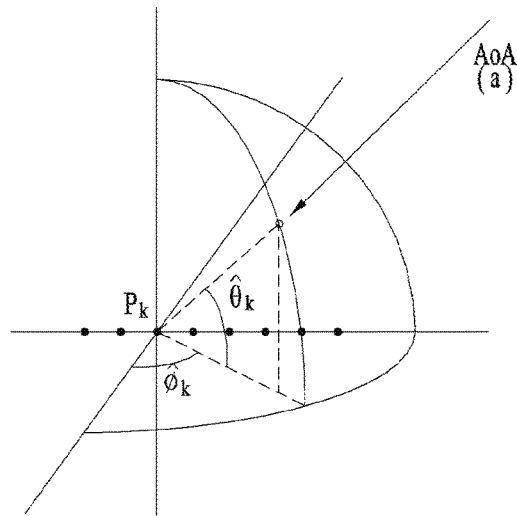
FIG. 15 is a conceptual diagram illustrating an antenna position ($p_k$) of a user equipment (UE), an estimated AoA angle in a vertical direction, and an estimated AoA angle in a horizontal direction.

The mmWave BS included in the mmWave TAG may acquire the mmWave candidate beam scanning information on the basis of position estimation information decided by the legacy scheme for the UE. FIG. 15 is a conceptual diagram illustrating an antenna position ($p_k$) of a user equipment (UE), an estimated AoA angle in a vertical direction, and an estimated AoA angle in a horizontal direction.

In FIG. 15, $p_k$ is the UE position, i.e., the position of the UE antenna, $\hat{\phi}_k$ is a horizontal angle for the measured AoA, and $\hat{\theta}_k$ is a vertical angle for the measured AoA.

In beamforming, when the AoA estimation directional vector is denoted by $$\hat{a} = \begin{bmatrix} -\sin\hat{\theta}_k \cos\hat{\phi}_k \\ -\sin\hat{\theta}_k \sin\hat{\phi}_k \\ -\cos\hat{\theta}_k \end{bmatrix}$$

and $\hat{u}=-\hat{a}$, the circular wave number vector is denoted by $$\vec{k} = -\frac{2\pi}{\lambda}\hat{u}.$$

Therefore, an array manifold vector is denoted as $$\vec{V}_k(\vec{k}) = \begin{bmatrix} e^{-j\vec{k}^T p_0} \\ \vdots \\ e^{-j\vec{k}^T p_{N-1}} \end{bmatrix}.$$

In this case, if $k_T$ is defined as a steering direction value, the final conventional beam pattern gain formula may be represented by the following formula 7.

$$B_{u_c}(\vec{k}; k_T) = \frac{1}{N}\vec{V}_k^H(k_T)\vec{V}_k(\vec{k}) \qquad \text{[Formula 7]}$$

Therefore, the beam direction $k_T$ is adjusted through the estimation angle of the Tx/Rx sides, such that the mmWave BS may determine the beam scanning direction. However, when the legacy position estimation algorithm errors are considered, the angle (û) between the estimated mmWave BS and the mmWave UE is incorrect. Therefore, the mmWave BS may establish the candidate beam scanning set, such that the UE can control beam scanning execution.

For example, assuming that the UE position estimation error is changed according to the position estimation error algorithm, if the mmWave beam resolution is 10°, the angle difference for beam resolution may be ±30° and the estimated angle may be denoted by $\hat{\theta}$. In this case, the candidate beam scanning subset is set to $\{\hat{\theta}-30°, \hat{\theta}-20°, \hat{\theta}-10°, \hat{\theta}, \hat{\theta}+10°, \hat{\theta}+20°, \hat{\theta}+30°\}$. In this case, the beam scanning subset may be referred to as first angle information.

When the UE performs mmWave ray scanning or beam scanning, the case in which the UE performs beam scanning in the candidate beam scanning subset may have complexity lower than that of the other case in which the UE performs beam scanning with the beam width of 10° in overall 360 degrees. That is, the complexity of the first case is lower than that of the second case by $$\frac{60}{360} = \frac{1}{6}$$

times.

In addition, the UE may calculate the angle $\hat{\varphi}_i$ corresponding to each BS included in the mmWave TAG on the basis of the first angle information received from the mmWave BS. In addition, the mmWave BS may calculate the second angle information on the basis of the first angle information. In this case, the candidate beam scanning subset to be executed by the mmWave BS may be set to $\{\hat{\varphi}-30°, \hat{\varphi}-20°, \hat{\varphi}-10°, \hat{\varphi}, \hat{\varphi}+10°, \hat{\varphi}+20°, \hat{\varphi}+30°,\}$ In this case, the beam scanning subset may be referred to as second angle information.

In conclusion, the UE may first perform the mmWave ray scanning or the mmWave beam scanning within the beam scanning subset based on the candidate beamforming information (i.e., first angle information), the BS may then perform the mmWave ray scanning or the mmWave beam scanning within the beam scanning subset based on the second angle information, such that the overall beam scanning complexity may be reduced by $$\frac{1}{36}$$

times.

Figure 16:
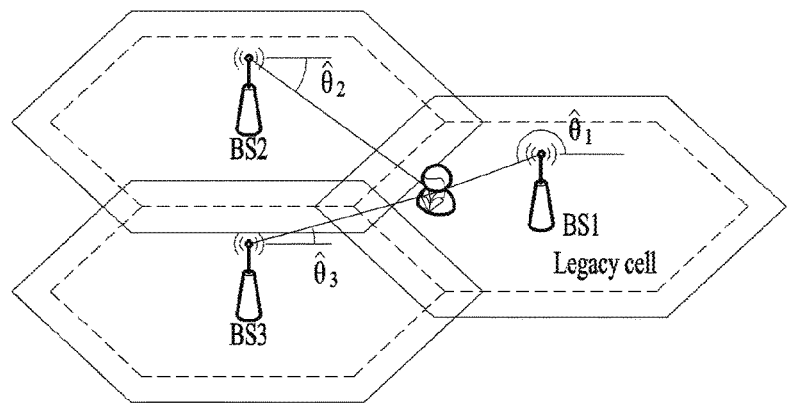
FIG. 16 is a conceptual diagram illustrating a method for estimating a beam direction using candidate beam scanning information.
Figure 16:
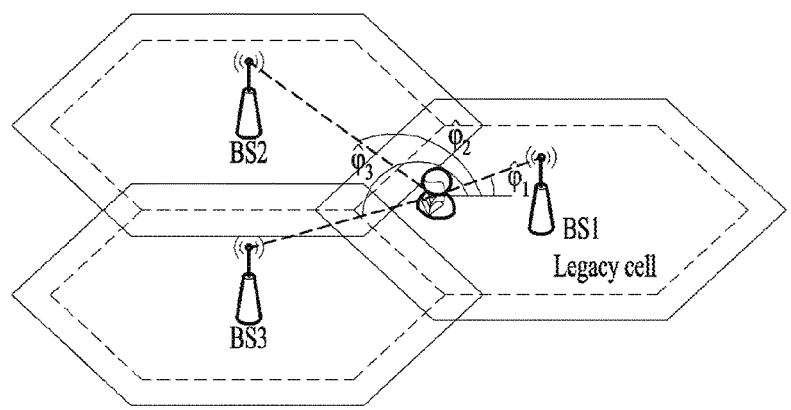
Figure 17:
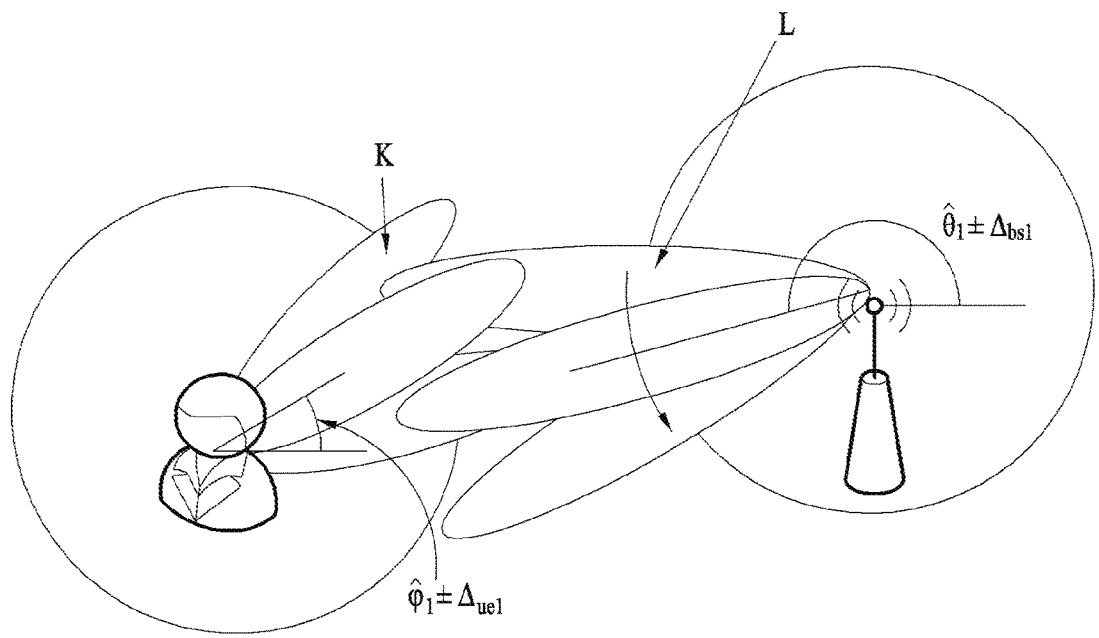
FIG. 17 is a conceptual diagram illustrating mmWave ray scanning or mmWave beam scanning using candidate beam scanning information.
Figure 17:
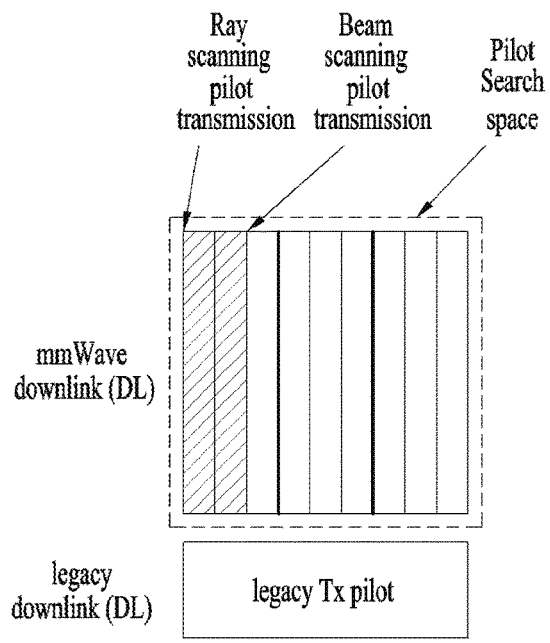

FIG. 16 is a conceptual diagram illustrating a method for estimating a beam direction using candidate beam scanning information. FIG. 17 is a conceptual diagram illustrating mmWave ray scanning or mmWave beam scanning using candidate beam scanning information.

As can be seen from FIG. 16(a), the legacy BS may estimate the UE position on the basis of UE position information, may transmit the UE position information to the mmWave BS, and may calculate the first angle information in such a manner that the mmWave BSs can estimate the beam direction based on AoA. Each mmWave BS may transmit the first angle information to the UE. Thereafter, the UE may perform mmWave beam scanning along with the respective mmWave BSs on the basis of the first angle information.

As can be seen from FIG. 16(b), the UE may estimate second angle information regarding the respective mmWave BSs on the basis of the first angle information received from the mmWave BSs. The mmWave BSs may detect the mmWave pilot signal received from the UE on the basis of the second angle information.

As can be seen from FIG. 17(a), the UE and the mmWave BS may perform ray scanning and beam scanning on the basis of the mmWave candidate beamforming information. In FIG. 17(a), the UE may perform only K ray scanning operations based on the first angle information from among a total of N ray scanning operations, and the BS may perform only L ray scanning operations based on the second angle information from among a total of N beam scanning operations.

FIG. 17(b) illustrates the mmWave pilot signal corresponding to the legacy pilot signal. In order to perform mmWave ray scanning or mmWave beam scanning, the UE and/or the BS must transmit the mmWave pilot signal.

Referring to FIG. 17(b), the mmWave pilot signals may be transmitted in the same time section as a time section in which the legacy pilot signal is transmitted, and may be allocated to different bandwidths. That is, the UE has already recognized that the mmWave pilot signal is transmitted at a detection time of the legacy pilot signal, such that the UE may detect the mmWave pilot signal in the subframe or symbol through which the legacy pilot signal is transmitted. For this purpose, the UE may have capability to decode or receive the mmWave downlink band and the legacy downlink band.

Referring to FIGS. 16 and 17, when the UE and the mmWave BS perform mmWave ray scanning and beam scanning using the first angle information based on the UE position information and the candidate beam scanning information based on the second angle information, it can be confirmed that overall scanning complexity is reduced from $(N+1)^2$ to $(K+1)(L+1)$.

Therefore, when legacy multiple joint transmission is configured in the legacy TAG, the scanning search space may be disposed between the mmWave BS and the mmWave UE contained in the corresponding mmWave TAG on the basis of each legacy subframe, each frame, and/or each radio frame index. Therefore, the UE may detect the mmWave scanning pilot signal transmitted from each mmWave BS.

Figure 18:
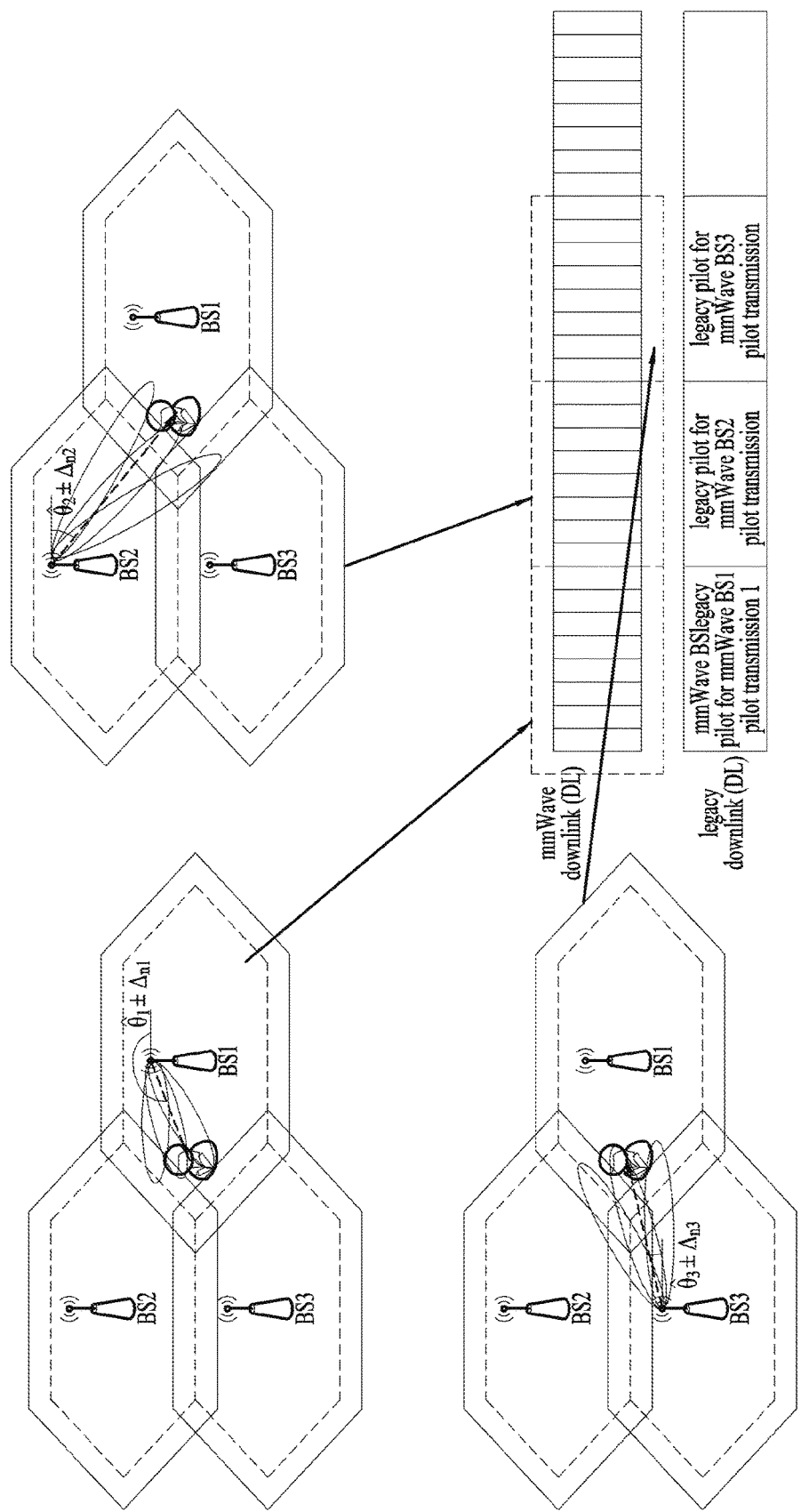
FIG. 18 is a conceptual diagram illustrating one example of structures for transmitting a scanning pilot signal between a mmWave TAG and candidate subsets.

FIG. 18 is a conceptual diagram illustrating one example of structures for transmitting the scanning pilot signal between the mmWave TAG and each candidate subset.

Referring to FIG. 18, three mmWave BSs may be present in the mmWave TAG. One of the three mmWave BSs may be a base station (BS) of the legacy PCell. In this case, the legacy PCell BS may operate as the mmWave BS. In addition, the legacy PCell may operate as the first base station (BS1) acting as the mmWave BS. The UE and the BS1 may perform beam scanning on the basis of mmWave candidate beam scanning information, the UE and the BS2 may then perform the same beam scanning, and the UE and the BS3 may finally perform the same beam scanning.

In this case, the mmWave pilot signal for mmWave beam scanning may be transmitted through the mmWave DL band, and the UE may receive the mmWave pilot signal by decoding the mmWave search space.

In addition, the UE may transmit a temporary ID of the BS and the mmWave scanning pilot to the mmWave TAG corresponding to either each index timing or pilot transmission for mmWave scanning, such that scanning pilot transmission timing points of the UE and BSs included in each mmWave TAG are matched to each other. In this case, the temporary ID of the BS may identify each BS belonging to the mmWave TAG. That is, the BS temporary ID may be used to identify each mmWave pilot signal received by the UE.

4.5 Method for Processing mmWave Ray/Beam Scanning Failure

If the UE and/or the mmWave BS fail to detect the mmWave scanning pilot signal, the UE and/or the mmWave BS may perform beam scanning by extending the candidate beam scanning subset.

Figure 19:
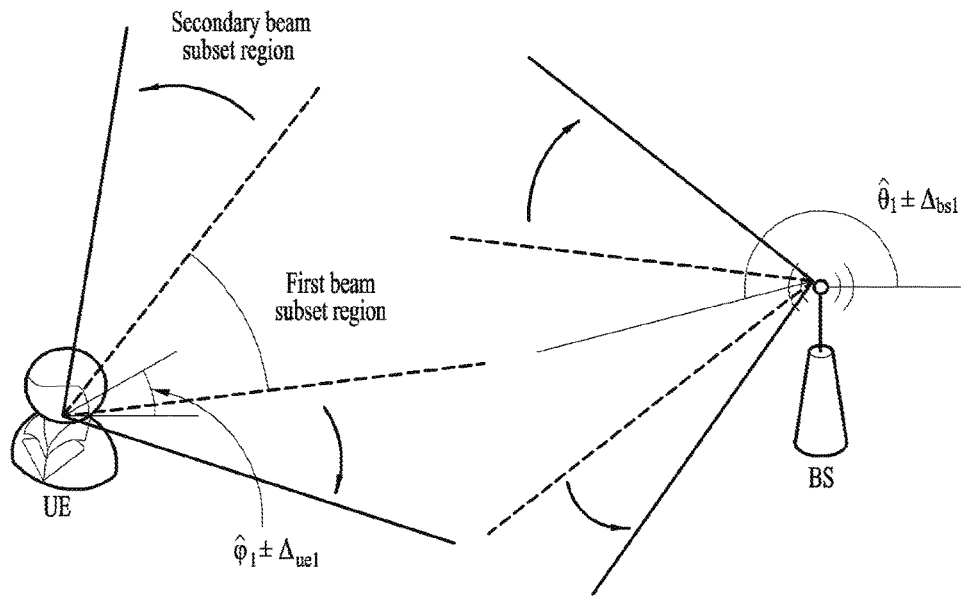
FIG. 19 is a conceptual diagram illustrating a method for extending candidate beam scanning subsets when detection of a first mmWave scanning pilot signal is failed.

FIG. 19 is a conceptual diagram illustrating a method for extending candidate beam scanning subsets when detection of a first mmWave scanning pilot signal is failed.

If the UE fails to perform mmWave ray scanning in the first beam scanning subset region, the UE may perform mmWave beam scanning in the second beam scanning subset generated by extension of the first beam scanning subset.

For example, the first beam scanning subset may be defined as the first angle information $\hat{\theta}$, the beam resolution may be 10°, and the angle error range may be ±30°. In this case, the first beam scanning subset may be established as shown in the following Table 7, and many more candidate beams may be established in the extended second beam scanning subset in consideration of the extended beam region. In this case, the second beam scanning subset may be established in consideration of the total beam scanning overhead when establishing the scanning subset.

TABLE 7

| First beam subset | Secondary beam subset |
|---|---|
| $\{\hat{\theta} - 30°, \hat{\theta} - 20°, \hat{\theta} - 10°,$ $\hat{\theta}, \hat{\theta} + 10°, \hat{\theta} + 20°,$ $\hat{\theta} + 30°\}$ | $\{\hat{\theta} - 50°, \hat{\theta} - 40°, \hat{\theta} - 30°,$ $\hat{\theta} - 20°, \hat{\theta} - 10°, \hat{\theta},$ $\hat{\theta} + 10°, \hat{\theta} + 20°, \hat{\theta} + 30°,$ $\hat{\theta} + 40°, \hat{\theta} + 50°\}$ |

Figure 20:
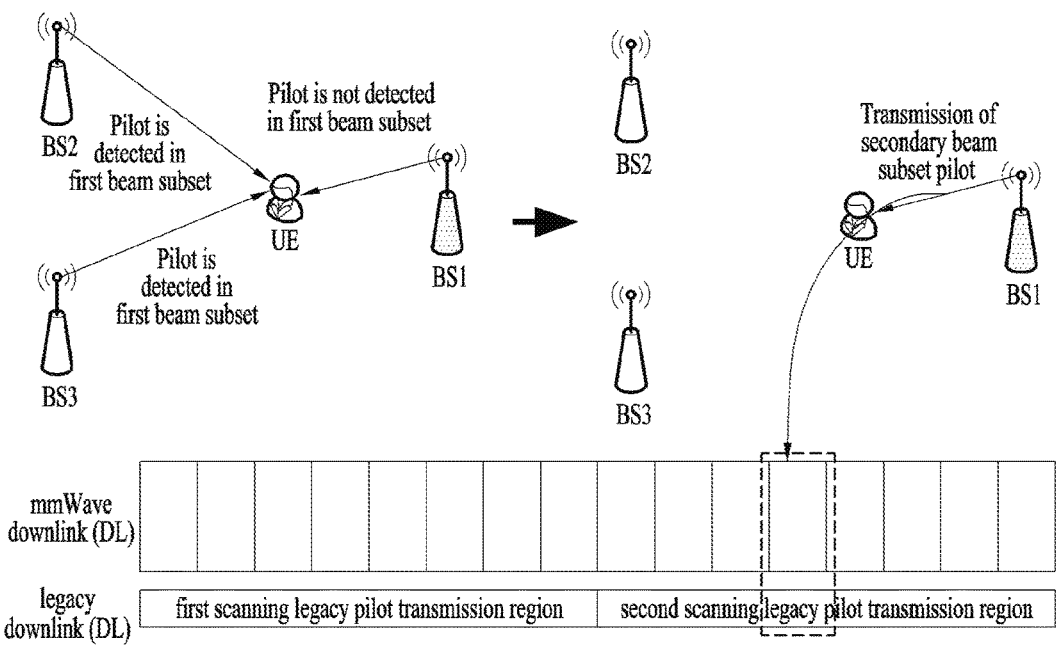
FIG. 20 is a conceptual diagram illustrating UE operations generated when mmWave ray/beam scanning failure occurs.

FIG. 20 is a conceptual diagram illustrating UE operations generated when mmWave ray/beam scanning failure occurs.

Referring to FIG. 20, BS1, BS2 and BS3 included in the mmWave TAG in the first scanning legacy pilot transmission region may transmit the mmWave pilot signal to the UE, thereby supporting ray scanning. However, whereas the UE has successfully performed the mmWave ray/beam scanning in cooperation with BS2 and BS3 included in the mmWave TG, the UE and BS1 has failed to perform mmWave ray/beam scanning.

In the first mmWave pilot transmission region transmitted at the legacy pilot Tx timing point, the mmWave BSs in which the mmWave pilot signal is detected may not transmit the second mmWave pilot signal to the UE. In this case, according to the embodiments of the present invention, the UE may transmit information regarding detection or non-detection of the mmWave pilot signal (i.e., success or failure of the mmWave ray/beam scanning) to the BS through the legacy link. Alternatively, when the UE transmits the mmWave pilot signal for mmWave ray/beam scanning, the UE may also transmit the legacy pilot to the legacy link. In this case, assuming that the BS receives the legacy pilot signal to be transmitted to the legacy link and does not receive the mmWave pilot signal, the BS may recognize failure of the mmWave ray/beam scanning.

Therefore, only the BS1 can transmit the mmWave pilot signal to the UE using the second beam scanning subset defined in Table 3 according to the legacy pilot Tx timing point for the second mmWave scanning.

In accordance with the embodiments of the present invention, the first mmWave scanning pilot detection timing point and the second mmWave scanning pilot detection timing point may be decided according to the legacy pilot transmission region. In addition, the mmWave scanning pilot signal along with each mmWave TID (i.e., temporary BS ID) may be transmitted to the UE, such that each BS can be identified.

5. Implementation Device

Figure 21:
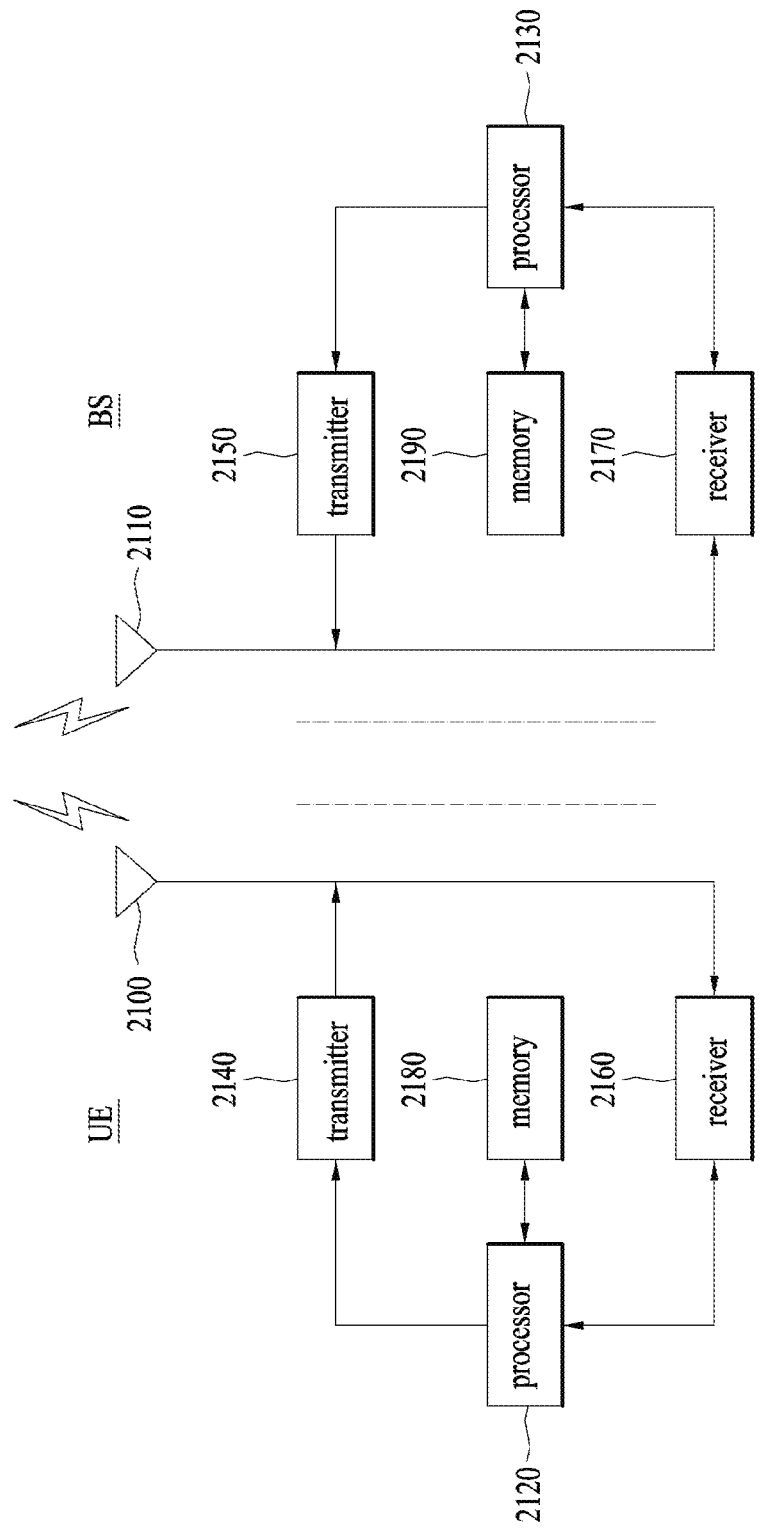
FIG. 21 is a diagram of a device that is a means for implementing the methods described with reference to FIGS. 1 to 20.

A device described in FIG. 21 is a means for implementing the methods described with reference to FIGS. 1 to 20.

A UE (user equipment) can operate as a transmitter on uplink or a receiver on downlink. A BS (base station) (eNB: e-Node B) can operate as a receiver in uplink or a transmitter on downlink.

Namely, the UE/BS may include a transmitter 2140/2150 and a receiver 2150/2170 to control transmission and reception of data and/or messages, and may further include an antenna 2100/2110 and the like to transmit and receive information, data and/or messages.

The UE/BS may include a processor 2120/2130 for performing embodiments of the present invention mentioned in the foregoing description and a memory 2180/2190 for storing an operation process of the processor temporarily or permanently.

The embodiments of the present invention can be performed using the components and functions of the UE and BS devices. For instance, the processor of the BS may calculate first angle information on the basis of UE position information. Thereafter, the processor may transmit the first angle information to the UE through the transmitter of the BS. The UE processor may calculate second angle information to be used for mmWave beam scanning on the basis of the received first angle information, and may transmit the calculated second angle information to the BS through the transmitter. For details associated with UE and BS operations, refer to contents of the first to third paragraphs.

The Tx and Rx modules included in the UE/BS can perform a packet modulation/demodulation function for data transmission, a fast packet channel coding function, OFDMA (orthogonal frequency division multiple access) packet scheduling, TDD (Time Division Duplex) packet scheduling and/or a channel multiplexing function. Moreover, the UE/BS of FIG. 21 may further include a low power RF/IF (Radio Frequency/Intermediate Frequency) module.

Meanwhile, in the present invention, a user equipment may use a PDA (Personal Digital Assistant), a cellular phone, a PCS (Personal Communication Service) phone, a GSM (Global System for Mobile) phone, a WCDMA (Wideband CDMA) phone, an MBS (Mobile Broadband System) phone, a handheld PC, a notebook PC, a smartphone, a MM-MB (Multi Mode-Multi Band) terminal or the like.

Herein, the smartphone is a user equipment having the mixed benefits of a mobile communication terminal and a PDA, and may mean a terminal in which PDA's data communication functions such as schedule management, fax transmission/reception, internet access and the like are integrated with the mobile terminal. Moreover, the MM-MB terminal means a terminal operational in a mobile internet system and other mobile communication systems (e.g., CDMA (Code Division Multiple Access) 2000 system, WCDMA (Wideband CDMA) system, etc.) using a multimodem chip.

Embodiments of the present invention may be implemented using various means. For instance, embodiments of the present invention can be implemented using hardware, firmware, software and/or any combinations thereof.

In the case of implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors and the like.

In the case of implementation by firmware or software, a method according to each embodiment of the present invention can be implemented by modules, procedures, and/or functions for performing the above-explained functions or operations. Software code is stored in the memory unit 2180/2190 and is then drivable by the processor 2120/2130. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present are applicable to various wireless access systems. Examples of the various wireless access systems include 3GPP (3rd Generation Partnership Project) system, 3GPP2 system and/or IEEE 802.xx (Institute of Electrical and Electronic Engineers 802) system and the like. The embodiments of the present are applicable to all technical fields having the various wireless access systems applied thereto as well as to various wireless access systems.

What is claimed is:

1. A method for performing millimeter wave (mmWave) beam scanning on the basis of UE position information by a user equipment in a wireless access system supporting mmWave technology, comprising:
   receiving a positioning reference signal from a legacy base station;
   calculating measurement information for calculating position information of the UE on the basis of the positioning reference signal;
   transmitting the measurement information to the legacy base station;
   receiving first angle information generated based on the measurement information from a mmWave base station;
   determining a mmWave PCell by performing first mmWave beam scanning based on the first angle information; and
   transmitting a mmWave pilot signal for second mmWave beam scanning to the mmWave PCell.

2. The method according to claim 1, wherein the first angle information is a set of some beam scanning angles contained in an angle range of 360° needed for performing the first mmWave beam scanning.

3. The method according to claim 1, further comprising:
   calculating, by the user equipment, second angle information indicating a set of angles at which the UE and the mmWave base station are scheduled to perform the second mmWave beam scanning on the basis of the first angle information.

4. The method according to claim 3, further comprising:
   transmitting, by the user equipment, the second angle information to the mmWave base station.

5. The method according to claim 1, wherein the legacy base station establishes a mmWave Tracking Area Group (TAG) including at least one mmWave base station to be used for execution of the mmWave beam scanning, and transmits the position information to the at least one mmWave base station.

6. A user equipment for performing millimeter wave (mmWave) beam scanning on the basis of UE position information in a wireless access system supporting mmWave technology comprising:
   a transmitter;
   a receiver; and
   a processor configured to support the mmWave beam scanning,
   wherein the processor is configured to:
   receive a positioning reference signal from a legacy base station by controlling the receiver,
   calculate measurement information for calculating position information of the UE on the basis of the positioning reference signal,
   transmit the measurement information to the legacy base station by controlling the transmitter,
   receive first angle information generated based on the measurement information from a mmWave base station by controlling the receiver,
   determine a mmWave PCell by performing first mmWave beam scanning based on the first angle information, and
   transmit a mmWave pilot signal for second mmWave beam scanning to the mmWave PCell.

7. The user equipment according to claim 6, wherein the first angle information is a set of some beam scanning angles contained in an angle range of 360° needed for performing the first mmWave beam scanning.

8. The user equipment according to claim 6, wherein the processor is configured to calculate second angle information indicating a set of angles at which the UE and the mmWave base station are scheduled to perform the second mmWave beam scanning on the basis of the first angle information.

9. The user equipment according to claim 8, wherein the processor is configured to transmit the second angle information to the mmWave base station by controlling the transmitter.

10. The user equipment according to claim 6, wherein the legacy base station establishes a mmWave Tracking Area Group (TAG) including at least one mmWave base station to be used for execution of the mmWave beam scanning, and transmits the position information to the at least one mmWave base station.

* * * * *